United States Patent
Sarkis et al.

(10) Patent No.: US 12,191,955 B2
(45) Date of Patent: *Jan. 7, 2025

(54) ULTRA-RELIABLE LOW LATENCY COMMUNICATION WITH MULTIPLE TRANSMISSION-RECEPTION POINTS

(71) Applicant: QUALCOMM Incorporated, San Diego, CA (US)

(72) Inventors: Gabi Sarkis, San Diego, CA (US); Wanshi Chen, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,348

(22) Filed: May 24, 2023

(65) Prior Publication Data

US 2023/0387991 A1 Nov. 30, 2023

Related U.S. Application Data

(63) Continuation of application No. 17/536,760, filed on Nov. 29, 2021, now Pat. No. 11,705,951, which is a
(Continued)

(30) Foreign Application Priority Data

May 11, 2018 (GR) ............... 20180100203

(51) Int. Cl.
*H04B 17/309* (2015.01)
*H04B 7/06* (2006.01)

(52) U.S. Cl.
CPC ........... *H04B 7/0626* (2013.01); *H04B 7/063* (2013.01); *H04B 7/0632* (2013.01); *H04B 17/309* (2015.01)

(58) Field of Classification Search
CPC .... H04B 7/0626; H04B 7/063; H04B 7/0632; H04B 17/309; H04L 5/0058; H04L 5/0048
See application file for complete search history.

(56) References Cited

U.S. PATENT DOCUMENTS

| | | | |
|---|---|---|---|
| 8,825,099 | B2 | 9/2014 | Blanz et al. |
| 10,567,136 | B2 | 2/2020 | You et al. |

(Continued)

FOREIGN PATENT DOCUMENTS

| | | |
|---|---|---|
| CN | 107211296 A | 9/2017 |
| CN | 108282294 A | 7/2018 |

(Continued)

OTHER PUBLICATIONS

European Search Report—EP23207673—Search Authority—The Hague—Jan. 30, 2024.
(Continued)

*Primary Examiner* — Siu M Lee
(74) *Attorney, Agent, or Firm* — Holland & Hart LLP/Qualcomm

(57) ABSTRACT

The techniques described herein provide procedures at user equipment (UEs) for performing channel state information (CSI) reporting and sounding reference signal (SRS) transmissions based on an ultra-reliable low latency communication (URLLC) block error rate (BLER) target and for reliably receiving PDCCH transmissions. For CSI reporting, a UE may be configured to generate a CSI report based on a BLER target and on received CSI reference signals (CSI-RSs), where the CSI-RSs may be transmitted on one or more groups of quasi co-located antenna ports. For SRS transmissions, a UE may be configured to transmit SRS based on an SRS configuration determined based on a BLER target. For receiving PDCCH transmissions, a UE may be config-
(Continued)

ured to receive and combine DCI received from multiple base stations.

20 Claims, 17 Drawing Sheets

Related U.S. Application Data continuation of application No. 17/062,830, filed on Oct. 5, 2020, now Pat. No. 11,190,258, which is a continuation of application No. 16/406,387, filed on May 8, 2019, now Pat. No. 10,797,774.

(56) References Cited

U.S. PATENT DOCUMENTS

| | | | |
|---|---|---|---|
| 10,797,774 | B2 | 10/2020 | Sarkis et al. |
| 11,180,258 | B2 | 11/2021 | Chadwell |
| 11,190,258 | B2 * | 11/2021 | Sarkis .................. H04L 5/0053 |
| 11,451,339 | B2 | 9/2022 | Papasakellariou |
| 11,705,951 | B2 * | 7/2023 | Sarkis .................. H04L 5/0053 |
| | | | 375/262 |
| 2013/0064216 | A1 | 3/2013 | Gao et al. |
| 2015/0208390 | A1 | 7/2015 | Zhao et al. |
| 2015/0223213 | A1 | 8/2015 | Moon et al. |
| 2016/0013903 | A1 | 1/2016 | Kim et al. |
| 2016/0278054 | A1 * | 9/2016 | You .......................... H04W 4/70 |
| 2016/0301505 | A1 | 10/2016 | Furuskog et al. |
| 2017/0171842 | A1 | 6/2017 | You et al. |
| 2017/0230994 | A1 | 8/2017 | You et al. |
| 2018/0227942 | A1 | 8/2018 | Hwang et al. |
| 2018/0249446 | A1 * | 8/2018 | You ....................... H04L 1/0072 |
| 2018/0278301 | A1 | 9/2018 | Kim et al. |
| 2018/0279273 | A1 * | 9/2018 | Yang .................... H04B 7/0613 |
| 2019/0246416 | A1 * | 8/2019 | Park ....................... H04L 1/1812 |
| 2019/0305911 | A1 | 10/2019 | Sarkis et al. |
| 2019/0313321 | A1 * | 10/2019 | Xu .......................... H04L 5/0053 |
| 2020/0170000 | A1 | 5/2020 | Hang et al. |
| 2020/0260416 | A1 * | 8/2020 | Kim ....................... H04B 7/088 |
| 2020/0374051 | A1 | 11/2020 | Goktepe et al. |
| 2022/0158705 | A1 | 5/2022 | Sarkis et al. |

FOREIGN PATENT DOCUMENTS

| | | |
|---|---|---|
| JP | 2015144458 A | 8/2015 |
| WO | 2008086374 | 7/2008 |
| WO | WO-2013131268 A1 | 9/2013 |
| WO | 2014112780 A1 | 7/2014 |
| WO | 2014129716 A1 | 8/2014 |
| WO | 2018044849 A1 | 3/2018 |

OTHER PUBLICATIONS

Ericsson: "[Draft] LS on Simplification of CSI-MeasConfig", 3GPP TSG-RAN WG2 NR AH#3, Tdoc R2-1801598, Vancouver, Canada, Jan. 22-26, 2018, 17 Pages.

International Search Report and Written Opinion—PCT/US2019/031552—ISA/EPO—Sep. 30, 2019.

Mediatek Inc: "MCS and CQI Tables Design for URLLC", 3GPP TSG RAN WG1 Meeting R1-92, R1-1801676, Athens, Greece, Feb. 26-Mar. 2, 2018, pp. 1-9.

Partial International Search Report—PCT/US2019/031552—ISA/EPO—Jul. 29, 2019.

Qualcomm Incorporated: "Considerations for CQI and MCS for URLLC", 3GPP TSG-RAN WG1 #92, R1-1802851, Feb. 26-Mar. 2, 2018, Athens, Greece, pp. 1-5.

* cited by examiner

ULTRA-RELIABLE LOW LATENCY COMMUNICATION WITH MULTIPLE TRANSMISSION-RECEPTION POINTS

CROSS REFERENCES

The present application for patent is a Continuation of U.S. patent application Ser. No. 17/536,760 by SARKIS et al., entitled "ULTRA-RELIABLE LOW LATENCY COMMUNICATION WITH MULTIPLE TRANSMISSION-RECEPTION POINTS" filed Nov. 29, 2021 which is a Continuation of U.S. patent application Ser. No. 17/062,830 by SARKIS et al., entitled "ULTRA-RELIABLE LOW LATENCY COMMUNICATION WITH MULTIPLE TRANSMISSION-RECEPTION POINTS" filed Oct. 5, 2020, now U.S. Granted U.S. Pat. No. 11,190,258 which granted on Nov. 30, 2021, which is a Continuation of U.S. patent application Ser. No. 16/406,387 by SARKIS et al., entitled "ULTRA-RELIABLE LOW LATENCY COMMUNICATION WITH MULTIPLE TRANSMISSION-RECEPTION" filed May 8, 2019, now U.S. Granted U.S. Pat. No. 10,797,774 which granted on Oct. 6, 2020, which claims the benefit of Greece Provisional Patent Application No. 20180100203 by SARKIS, et al., entitled "ULTRA-RELIABLE LOW LATENCY COMMUNICATION WITH MULTIPLE TRANSMISSION-RECEPTION POINTS," filed May 11, 2018, assigned to the assignee hereof, and expressly incorporated by reference herein.

BACKGROUND

The following relates generally to wireless communications and more specifically to ultra-reliable low latency communication (URLLC) with multiple transmission-reception points (TRPs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support URLLC between a base station and a UE. In some cases, different URLLC applications or services may be associated with different block error rate (BLER) targets or reliability targets (e.g., $10^{-5}$ or $10^{-9}$). Conventional techniques for performing channel state information (CSI) reporting, sounding reference signal (SRS) transmissions, and physical downlink control channel (PDCCH) transmissions for URLLC may be deficient considering the different BLER targets associated with different URLLC applications or services.

SUMMARY

The described techniques relate to improved methods, systems, devices, or apparatuses that support ultra-reliable low latency communication (URLLC) with multiple transmission-reception points (TRPs). Specifically, the techniques described herein are related to performing channel state information (CSI) reporting and sounding reference signal (SRS) transmissions based on a URLLC block error rate (BLER) target, and reliably receiving PDCCH transmissions. For CSI reporting, a UE may be configured to generate a CSI report based on a BLER target and on received CSI reference signals (CSI-RSs), where the CSI-RSs may be transmitted on one or more groups of quasi co-located antenna ports (e.g., by multiple TRPs). For SRS transmissions, a UE may be configured to determine a configuration for an SRS transmission based on a BLER target configured for the SRS transmission, and the UE may transmit the SRS according to the determined configuration. For receiving PDCCH transmissions, a UE may be configured to receive the same downlink control information (DCI) from multiple base stations in different physical downlink control channel (PDCCH) candidates, and the UE may combine the DCI received from the multiple base stations.

A method for wireless communication at a UE is described. The method may include receiving a plurality of CSI-RSs on corresponding CSI-RS resources associated with a CSI report, the plurality of CSI-RSs being associated with one or more sets of quasi co-located antenna ports; identifying, from a plurality of BLER targets, at least one BLER target; generating the CSI report based at least in part on the at least one BLER target and the plurality of CSI-RSs; and transmitting the generated CSI report.

An apparatus for wireless communication at a UE is described. The apparatus may include means for receiving a plurality of CSI-RSs on corresponding CSI-RS resources associated with a CSI report, the plurality of CSI-RSs being associated with one or more sets of quasi co-located antenna ports; means for identifying, from a plurality of BLER targets, at least one BLER target; means for generating the CSI report based at least in part on the at least one BLER target and the plurality of CSI-RSs; and means for transmitting the generated CSI report.

Another apparatus for wireless communication at a UE is described. The apparatus may include a processor, memory in electronic communication with the processor, and instructions stored in the memory. The instructions may be operable to cause the processor to receive a plurality of CSI-RSs on corresponding CSI-RS resources associated with a CSI report, the plurality of CSI-RSs being associated with one or more sets of quasi co-located antenna ports; identify, from a plurality of BLER targets, at least one BLER target; generate the CSI report based at least in part on the at least one BLER target and the plurality of CSI-RSs; and transmit the generated CSI report.

A non-transitory computer readable medium at a UE for wireless communication is described. The non-transitory computer-readable medium may include instructions operable to cause a processor to receive a plurality of CSI-RSs on corresponding CSI-RS resources associated with a CSI report, the plurality of CSI-RSs being associated with one or more sets of quasi co-located antenna ports; identify, from a plurality of BLER targets, at least one BLER target; generate the CSI report based at least in part on the at least one BLER target and the plurality of CSI-RSs; and transmit the generated CSI report.

Some examples of the method, apparatus, and non-transitory computer-readable medium described above may further include: determining that a single set of quasi co-located antenna ports was used to transmit the plurality of CSI-RSs on the corresponding CSI-RS resources; identifying that a same BLER target of the plurality of BLER targets is associated with the plurality of CSI-RSs received on the corresponding CSI-RS resources; and generating the CSI report based at least in part on the same BLER target and the received CSI-RSs.

Some examples of the method, apparatus, and non-transitory computer-readable medium described above may further include: determining that a first set of quasi co-located antenna ports was used to transmit a first set of the plurality of CSI-RSs and a second set of quasi co-located antenna ports was used to transmit a second set of the plurality of CSI-RSs; identifying that a single BLER target is associated with the plurality of CSI-RSs received on the corresponding CSI-RS resources; and generating the CSI report based at least in part on the single BLER target and the first and second sets of the plurality of CSI-RSs.

In some examples of the method, apparatus, and non-transitory computer-readable medium described above, generating the CSI report comprises: including a channel quality indicator (CQI) in the CSI report for each of the first and second sets of the plurality of CSI-RSs based at least in part on the single BLER target. In some examples of the method, apparatus, and non-transitory computer-readable medium described above, generating the CSI report comprises: including a CQI in the CSI report for either the first set of the plurality of CSI-RSs or the second set of the plurality of CSI-RSs based at least in part on the single BLER target. In some examples of the method, apparatus, and non-transitory computer-readable medium described above, generating the CSI report comprises: including a CQI in the CSI report for each of the first and second sets of the plurality of CSI-RSs transmitted on a single CSI-RS resource of the corresponding CSI-RS resources based at least in part on the single BLER target.

Some examples of the method, apparatus, and non-transitory computer-readable medium described above may further include: determining that a first set of quasi co-located antenna ports was used to transmit a first set of the plurality of CSI-RSs and a second set of quasi co-located antenna ports was used to transmit a second set of the plurality of CSI-RSs; identifying that multiple BLER targets of the plurality of BLER targets are associated with the plurality of CSI-RSs, each BLER target of the multiple BLER targets corresponding to a set of quasi co-located antenna ports used to transmit a set of the plurality of CSI-RSs; and generating the CSI report based at least in part on the multiple BLER targets and the first and second sets of the plurality of CSI-RSs.

In some examples of the method, apparatus, and non-transitory computer-readable medium described above, generating the CSI report comprises: including a first CQI in the CSI report for the first set of the plurality of CSI-RSs based at least in part on a first BLER target of the multiple BLER targets; and including a second CQI in the CSI report for the second set of the plurality of CSI-RSs based at least in part on a second BLER target of the multiple BLER targets.

In some examples of the method, apparatus, and non-transitory computer-readable medium described above, identifying the at least one BLER target associated with the CSI-RSs comprises: receiving a CSI report configuration indicating the at least one BLER target associated with the CSI-RSs. Some examples of the method, apparatus, and non-transitory computer-readable medium described above may further include receiving a control message indicating a CQI table associated with each of the plurality of BLER targets.

In some examples of the method, apparatus, and non-transitory computer-readable medium described above, the control message comprises a medium access control (MAC) control element (MAC-CE), radio resource control (RRC) message, or a DCI message. In some examples of the method, apparatus, and non-transitory computer-readable medium described above, the UE is configured to transmit CSI reports, including the generated CSI report, associated with a same BLER target. In some examples of the method, apparatus, and non-transitory computer-readable medium described above, the UE is configured to transmit CSI reports, including the generated CSI report, associated with different BLER targets.

A method for wireless communication at a base station, comprising: identifying a plurality of CSI-RSs to transmit on corresponding CSI-RS resources; transmitting a control message indicating at least one BLER target, of a plurality of BLER targets; transmitting the plurality of CSI-RSs on the corresponding CSI-RS resources on one or more sets of quasi co-located antenna ports; and receiving a CSI report based at least in part on the at least one BLER target and the plurality of CSI-RSs.

An apparatus for wireless communication at a base station is described. The apparatus may include means for identifying a plurality of CSI-RSs to transmit on corresponding CSI-RS resources; means for transmitting a control message indicating at least one BLER target, of a plurality of BLER targets; means for transmitting the plurality of CSI-RSs on the corresponding CSI-RS resources on one or more sets of quasi co-located antenna ports; and means for receiving a CSI report based at least in part on the at least one BLER target and the plurality of CSI-RSs.

Another apparatus for wireless communication at a base station is described. The apparatus may include a processor, memory in electronic communication with the processor, and instructions stored in the memory. The instructions may be operable to cause the processor to identify a plurality of CSI-RSs to transmit on corresponding CSI-RS resources; transmit a control message indicating at least one BLER target, of a plurality of BLER targets; transmit the plurality of CSI-RSs on the corresponding CSI-RS resources on one or more sets of quasi co-located antenna ports; and receive a CSI report based at least in part on the at least one BLER target and the plurality of CSI-RSs.

A non-transitory computer readable medium at a base station for wireless communication is described. The non-transitory computer-readable medium may include instructions operable to cause a processor to identify a plurality of CSI-RSs to transmit on corresponding CSI-RS resources; transmit a control message indicating at least one BLER target, of a plurality of BLER targets; transmit the plurality of CSI-RSs on the corresponding CSI-RS resources on one or more sets of quasi co-located antenna ports; and receive a CSI report based at least in part on the at least one BLER target and the plurality of CSI-RSs.

Some examples of the method, apparatus, and non-transitory computer-readable medium described above further include: identifying a CQI included in the CSI report associated with a BLER target of the at least one BLER target; selecting a modulation and coding scheme (MCS) for transmitting data associated with the BLER target based at least in part on the CQI; and transmitting the data using the selected MCS.

In some examples of the method, apparatus, and non-transitory computer-readable medium described above, selecting the MCS for transmitting the data associated with the BLER target comprises selecting the MCS for transmitting the data associated with the BLER target from an MCS table associated with the BLER target. In some examples of the method, apparatus, and non-transitory computer-readable medium described above, the MCS table associated with the BLER target is used to select MCSs for data transmissions using any set of antenna ports. In some examples of the method, apparatus, and non-transitory computer-readable medium described above, the MCS table associated with the BLER target comprises a first MCS table used to select MCSs for data transmissions using a first set of quasi co-located antenna ports, the first MCS table being different from a second MCS table used to select MCSs for data transmissions using a second set of quasi co-located antenna ports.

In some examples of the method, apparatus, and non-transitory computer-readable medium described above, the indication of the at least one BLER target is included in a CSI report configuration. Some examples of the method, apparatus, and non-transitory computer-readable medium described above further include transmitting another control message indicating a CQI table associated with each of the plurality of BLER targets. In some examples of the method, apparatus, and non-transitory computer-readable medium described above, the other control message comprises a MAC-CE, RRC message, or a DCI message.

A method for wireless communication at a UE, comprising identifying, from a plurality of BLER targets, a BLER target for a transmission of a SRS; determining a configuration for transmitting the SRS based at least in part on the BLER target; and transmitting the SRS according to the determined configuration.

An apparatus for wireless communication at a UE is described. The apparatus may include means for identifying, from a plurality of BLER targets, a BLER target for a transmission of a SRS; means for determining a configuration for transmitting the SRS based at least in part on the BLER target; and means for transmitting the SRS according to the determined configuration.

Another apparatus for wireless communication at a UE is described. The apparatus may include a processor, memory in electronic communication with the processor, and instructions stored in the memory. The instructions may be operable to cause the processor to identify, from a plurality of BLER targets, a BLER target for a transmission of a SRS; determine a configuration for transmitting the SRS based at least in part on the BLER target; and transmit the SRS according to the determined configuration.

A non-transitory computer readable medium at a UE for wireless communication is described. The non-transitory computer-readable medium may include instructions operable to cause a processor to identify, from a plurality of BLER targets, a BLER target for a transmission of a SRS; determine a configuration for transmitting the SRS based at least in part on the BLER target; and transmit the SRS according to the determined configuration.

In some examples of the method, apparatus, and non-transitory computer-readable medium described above, determining the configuration for transmitting the SRS based at least in part on the BLER target comprises determining a bandwidth for the SRS transmission based at least in part on the BLER target. In some examples of the method, apparatus, and non-transitory computer-readable medium described above, determining the configuration for transmitting the SRS based at least in part on the BLER target comprises determining a number of repetitions in a time or frequency domain for the SRS transmission based at least in part on the BLER target. In some examples of the method, apparatus, and non-transitory computer-readable medium described above, determining the configuration for transmitting the SRS based at least in part on the BLER target comprises determining a power for the SRS transmission based at least in part on the BLER target.

In some examples of the method, apparatus, and non-transitory computer-readable medium described above, determining the configuration for transmitting the SRS based at least in part on the BLER target comprises determining a number of symbols for the SRS transmission based at least in part on the BLER target. In some examples of the method, apparatus, and non-transitory computer-readable medium described above, determining the configuration for transmitting the SRS based at least in part on the BLER target comprises determining a comb level for the SRS transmission based at least in part on the BLER target. In some examples of the method, apparatus, and non-transitory computer-readable medium described above, the comb level is further based at least in part on a bandwidth to be used for the SRS transmission.

In some examples of the method, apparatus, and non-transitory computer-readable medium described above, identifying the BLER target for the transmission of the SRS comprises: receiving a CSI report configuration associated with at least one CSI-RS resource, the CSI report configuration indicating a BLER target for a CSI report; and identifying the BLER target for the transmission of the SRS as the BLER target for the CSI report based on an SRS resource for the transmission of the SRS being associated with the at least one CSI-RS resource.

Some examples of the method, apparatus, and non-transitory computer-readable medium described above further include receiving a control message indicating parameters for the SRS transmission. In some examples of the method, apparatus, and non-transitory computer-readable medium described above, the control message comprises a MAC-CE, RRC message, or a DCI message.

A method for wireless communication at a base station, comprising: identifying, from a plurality of BLER targets, a BLER target for a transmission of a SRS from a UE; transmitting, to the UE, a control message indicating the BLER target for the transmission of the SRS from the UE; and receiving the SRS in accordance with a configuration based at least in part on the BLER target.

An apparatus for wireless communication at a base station is described. The apparatus may include means for identifying, from a plurality of BLER targets, a BLER target for a transmission of a SRS from a UE; means for transmitting, to the UE, a control message indicating the BLER target for the transmission of the SRS from the UE; and means for receiving the SRS in accordance with a configuration based at least in part on the BLER target.

Another apparatus for wireless communication at a base station is described. The apparatus may include a processor, memory in electronic communication with the processor, and instructions stored in the memory. The instructions may be operable to cause the processor to identify, from a plurality of BLER targets, a BLER target for a transmission of a SRS from a UE; transmit, to the UE, a control message indicating the BLER target for the transmission of the SRS from the UE; and receive the SRS in accordance with a configuration based at least in part on the BLER target.

A non-transitory computer readable medium at a base station for wireless communication is described. The non-transitory computer-readable medium may include instructions operable to cause a processor to identify, from a plurality of BLER targets, a BLER target for a transmission of a SRS from a UE; transmit, to the UE, a control message indicating the BLER target for the transmission of the SRS from the UE; and receive the SRS in accordance with a configuration based at least in part on the BLER target.

In some examples of the method, apparatus, and non-transitory computer-readable medium described above, the configuration comprises a bandwidth used for the SRS transmission. In some examples of the method, apparatus, and non-transitory computer-readable medium described above, the configuration comprises a number of repetitions in a time or frequency domain used for the SRS transmission. In some examples of the method, apparatus, and non-transitory computer-readable medium described above, the configuration comprises a power used for the SRS transmission.

In some examples of the method, apparatus, and non-transitory computer-readable medium described above, the configuration comprises a number of symbols used for the SRS transmission. In some examples of the method, apparatus, and non-transitory computer-readable medium described above, the configuration comprises a comb level used for the SRS transmission. In some examples of the method, apparatus, and non-transitory computer-readable medium described above, the comb level is based at least in part on a bandwidth used for the SRS transmission.

In some examples of the method, apparatus, and non-transitory computer-readable medium described above, the indication of the BLER target is included in a channel state information (CSI) report configuration.

Some examples of the method, apparatus, and non-transitory computer-readable medium described above further include transmitting another control message indicating SRS parameters for the SRS transmission. In some examples of the method, apparatus, and non-transitory computer-readable medium described above, the other control message comprises a MAC-CE, RRC message, or a DCI message.

A method for wireless communication at a UE, comprising: monitoring a plurality of PDCCH candidates for DCI from a plurality of base stations; receiving the DCI in the PDCCH candidates from the plurality of base stations, wherein each PDCCH candidate that includes the DCI from one base station maps to a PDCCH candidate that includes the DCI from another base station; combining the DCI received from the plurality of base stations in the plurality of PDCCH candidates; and receiving data from or transmitting data to at least one of the plurality of base stations based at least in part on the combined DCI.

An apparatus for wireless communication at a UE is described. The apparatus may include means for monitoring a plurality of PDCCH candidates for DCI from a plurality of base stations; means for receiving the DCI in the PDCCH candidates from the plurality of base stations, wherein each PDCCH candidate that includes the DCI from one base station maps to a PDCCH candidate that includes the DCI from another base station; means for combining the DCI received from the plurality of base stations in the plurality of PDCCH candidates; and means for receiving data from or transmitting data to at least one of the plurality of base stations based at least in part on the combined DCI.

Another apparatus for wireless communication at a UE is described. The apparatus may include a processor, memory in electronic communication with the processor, and instructions stored in the memory. The instructions may be operable to cause the processor to monitor a plurality of PDCCH candidates for DCI from a plurality of base stations; receive the DCI in the PDCCH candidates from the plurality of base stations, wherein each PDCCH candidate that includes the DCI from one base station maps to a PDCCH candidate that includes the DCI from another base station; combine the DCI received from the plurality of base stations in the plurality of PDCCH candidates; and receive data from or transmitting data to at least one of the plurality of base stations based at least in part on the combined DCI.

A non-transitory computer readable medium at a UE for wireless communication is described. The non-transitory computer-readable medium may include instructions operable to cause a processor to monitor a plurality of PDCCH candidates for DCI from a plurality of base stations; receive the DCI in the PDCCH candidates from the plurality of base stations, wherein each PDCCH candidate that includes the DCI from one base station maps to a PDCCH candidate that includes the DCI from another base station; combine the DCI received from the plurality of base stations in the plurality of PDCCH candidates; and receive data from or transmitting data to at least one of the plurality of base stations based at least in part on the combined DCI.

In some examples of the method, apparatus, and non-transitory computer-readable medium described above, the data is rate-matched around the PDCCH candidates including DCI from the plurality of base stations and the PDCCH candidates without DCI from the plurality of base stations. In some examples of the method, apparatus, and non-transitory computer-readable medium described above, an index of each PDCCH candidate that includes the DCI is the same. In some examples of the method, apparatus, and non-transitory computer-readable medium described above, an aggregation level of each PDCCH candidate that includes the DCI is the same.

In some examples of the method, apparatus, and non-transitory computer-readable medium described above, a first PDCCH candidate including the DCI from a first base station spans a same set of resource elements as a second PDCCH candidate including the DCI from a second base station. In some examples of the method, apparatus, and non-transitory computer-readable medium described above, a first PDCCH candidate including the DCI from a first base station spans a different set of resource elements from a second PDCCH candidate including the DCI from a second base station. In some examples of the method, apparatus, and non-transitory computer-readable medium described above, a first PDCCH including the DCI from a first base station includes demodulation reference signals (DMRSs) on a same port as DMRSs included in a second PDCCH including the DCI from a second base station. In some examples of the method, apparatus, and non-transitory computer-readable medium described above, a first PDCCH including the DCI from a first base station includes demodulation reference signals (DMRSs) on a different port from DMRSs included in a second PDCCH including the DCI from a second base station.

DETAILED DESCRIPTION

Figure 1:
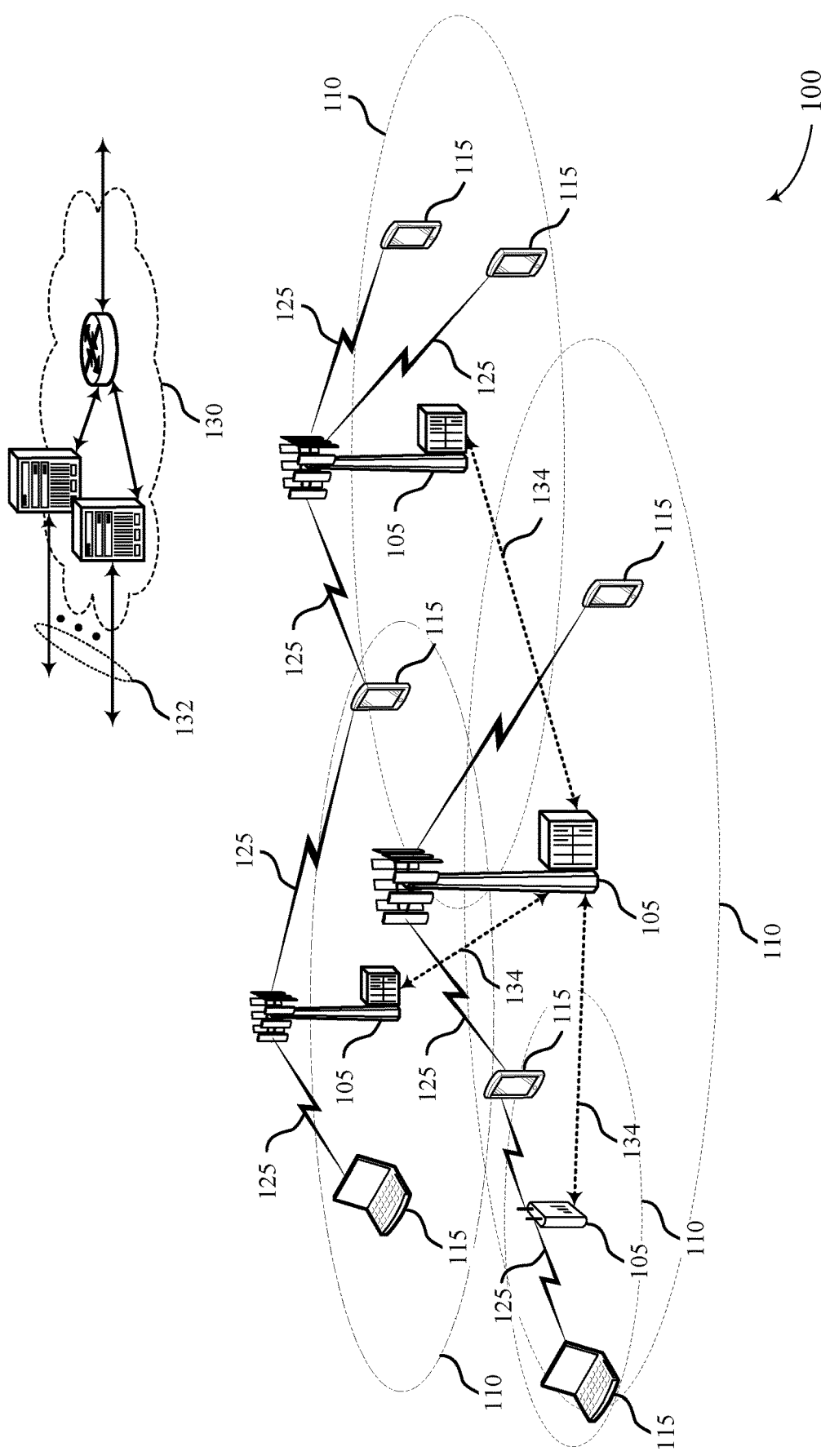
FIGS. 1-4 illustrate examples of wireless communications systems that support ultra-reliable low latency communication (URLLC) with multiple transmission-reception points (TRPs) in accordance with aspects of the present disclosure.

In some wireless communications systems, a user equipment (UE) may be configured to transmit channel state information (CSI) reports to a base station. CSI reports may include information for a base station to use to determine appropriate configurations for communicating with a UE. For instance, a CSI report from a UE may include a channel quality indicator (CQI) which a base station may use to identify a modulation and coding scheme (MCS) for a transmission to the UE. In addition to CSI reporting, a UE may be configured to transmit sounding reference signals (SRSs) to a base station which the base station may use to estimate the quality of channels available for communicating with the UE. The base station may then use the channel estimates to determine which resources to use to communicate with the UE. Thus, a base station 105 may use CSI reports and SRSs received from a UE to determine appropriate configurations and appropriate resources for communicating with the UE.

In some cases, different applications or services (e.g., communications with different transmission-reception points (TRPs)) may be associated with different block error rate (BLER) targets or reliability targets (e.g., $10^{-5}$ or $10^{-9}$). In such cases, if the information included in a CSI report is determined independent of a BLER target, and a base station determines a configuration for communicating with a UE using the information included in the CSI report, the base station may not be able to satisfy the BLER target for a particular application or service. Similarly, if a UE identifies a configuration for an SRS transmission to a base station independent of a BLER target configured for the SRS transmission, the UE may not be able to satisfy the BLER target for the SRS transmission. Further, if a UE is unable to receive control information from a base station (e.g., if a control information transmission from the base station is unreliable), the UE may not be able to identify resources allocated for communicating with the base station, resulting in reduced throughput in a wireless communications system.

As described herein, a wireless communications system may support efficient techniques for performing CSI reporting and SRS transmissions based on a configured BLER target, and for reliably receiving PDCCH transmissions. For CSI reporting, a UE may be configured to generate a CSI report based on a BLER target and on received CSI reference signals (CSI-RSs), where the CSI-RSs may be transmitted on one or more groups of quasi co-located antenna ports. For SRS transmissions, a UE may be configured to determine a configuration for an SRS transmission based on a BLER target configured for the SRS transmission, and the UE may transmit the SRS according to the determined configuration. For receiving physical downlink control channel (PDCCH) transmissions, a UE may be configured to receive downlink control information (DCI) from multiple base stations in PDCCH candidates from the multiple base stations, and the UE may combine the DCI received from the multiple base stations.

Aspects of the disclosure introduced above are described below in the context of a wireless communications system. Examples of processes and signaling exchanges that support ultra-reliable low latency communication (URLLC) with multiple TRPs are then described. Aspects of the disclosure are further illustrated by and described with reference to apparatus diagrams, system diagrams, and flowcharts that relate to URLLC with multiple TRPs.

FIG. 1 illustrates an example of a wireless communications system 100 that supports URLLC with multiple TRPs in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, URLLC, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces). As described herein, a base station 105 may transmit control information to a UE 115 in downlink control information (DCI), MAC control elements (MAC-CEs), or RRC messages. In some cases, the dynamic signaling of parameters described herein using DCI may significantly increase DCI size and may degrade the performance of DCI. Further, the use of RRC messages for signaling the parameters described herein may result in high latency. Thus, at least some of the parameters described herein may be signaled using MAC-CEs.

In some cases, a UE 115 may transmit uplink signals (e.g., SRSs) on resources interleaved with other resources used for other transmissions (e.g., SRS transmissions from different UEs), resulting in a comb-like effect. In such cases, the UE 115 may be configured to transmit an uplink transmission using different comb levels, where a comb level may correspond to the number of other transmissions with which the uplink transmission is interleaved (e.g., the gap between resources used for the interleaved uplink transmission). For instance, a high comb level (e.g., comb-6) may be associated with a large number of other transmissions interleaved with the uplink transmission (e.g., a large gap between resources used for the interleaved uplink transmission), and a low comb-level (e.g., comb-1 and comb-2) may be associated with a small number of other transmissions interleaved with the uplink transmission (e.g., a small gap between resources used for the interleaved uplink transmission).

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams.

Different spatial layers may be associated with different antenna ports used for channel measurement and reporting. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission). In some cases, some antenna ports may be referred to as quasi co-located, meaning that the spatial parameters associated with a transmission on one antenna port may be inferred from the spatial parameters associated with another transmission on a different antenna port. That is, the antenna ports may have a quasi co-location (QCL) relationship with each other. Transmissions from a group of quasi co-located antenna ports may be referred to as transmissions from a QCL group.

A UE 115 in wireless communications system 100 may be configured to transmit CSI reports to a base station 105. CSI reports may include information for a base station 105 to use to determine appropriate configurations for communicating with a UE 115. For instance, a CSI report from a UE 115 may include a CQI which a base station 105 may use to identify an MCS for a transmission to a UE 115. In addition to CSI reporting, a UE 115 may be configured to transmit SRSs to a base station 105. The base station 105 may transmit an indication of an SRS resource for the UE 115 to use for an SRS transmission, and the UE 115 may transmit the SRS on the SRS resource (e.g., using a same port used by the base station 105 to signal the SRS resource). The base station 105 may then use the SRSs to estimate the quality of channels available for communicating with the UE 115 such that the base station may be able to identify appropriate resources for communicating with the UE 115. Thus, a base station 105 may use CSI reports and SRSs received from a UE 115 to determine appropriate configurations and appropriate resources for communicating with the UE 115.

As mentioned above, wireless communications system 100 may support URLLC between base stations 105 and UEs 115. In some cases, different URLLC applications or services may be associated with different BLER targets or reliability targets (e.g., $10^{-5}$ or $10^{-9}$). In such cases, if the information included in a CSI report is determined independent of a BLER target, and a base station 105 determines a configuration for communicating with a UE 115 using the information included in the CSI report, the base station 105 may not be able to satisfy the BLER target for a particular application or service. Similarly, if a UE 115 identifies a configuration for an SRS transmission to a base station 105 independent of a BLER target configured for the SRS transmission, the UE 115 may not be able to satisfy the BLER target for the SRS transmission. Further, if a UE 115 is unable to receive control information from a base station 105 (e.g., if a control information transmission from the base station 105 is unreliable), the UE 115 may not be able to identify resources for communicating with the base station 105, resulting in reduced throughput in a wireless communications system. Wireless communications system 100 may support efficient techniques for performing CSI reporting and SRS transmissions based on a configured BLER target, and for reliably receiving PDCCH transmissions.

Figure 2:
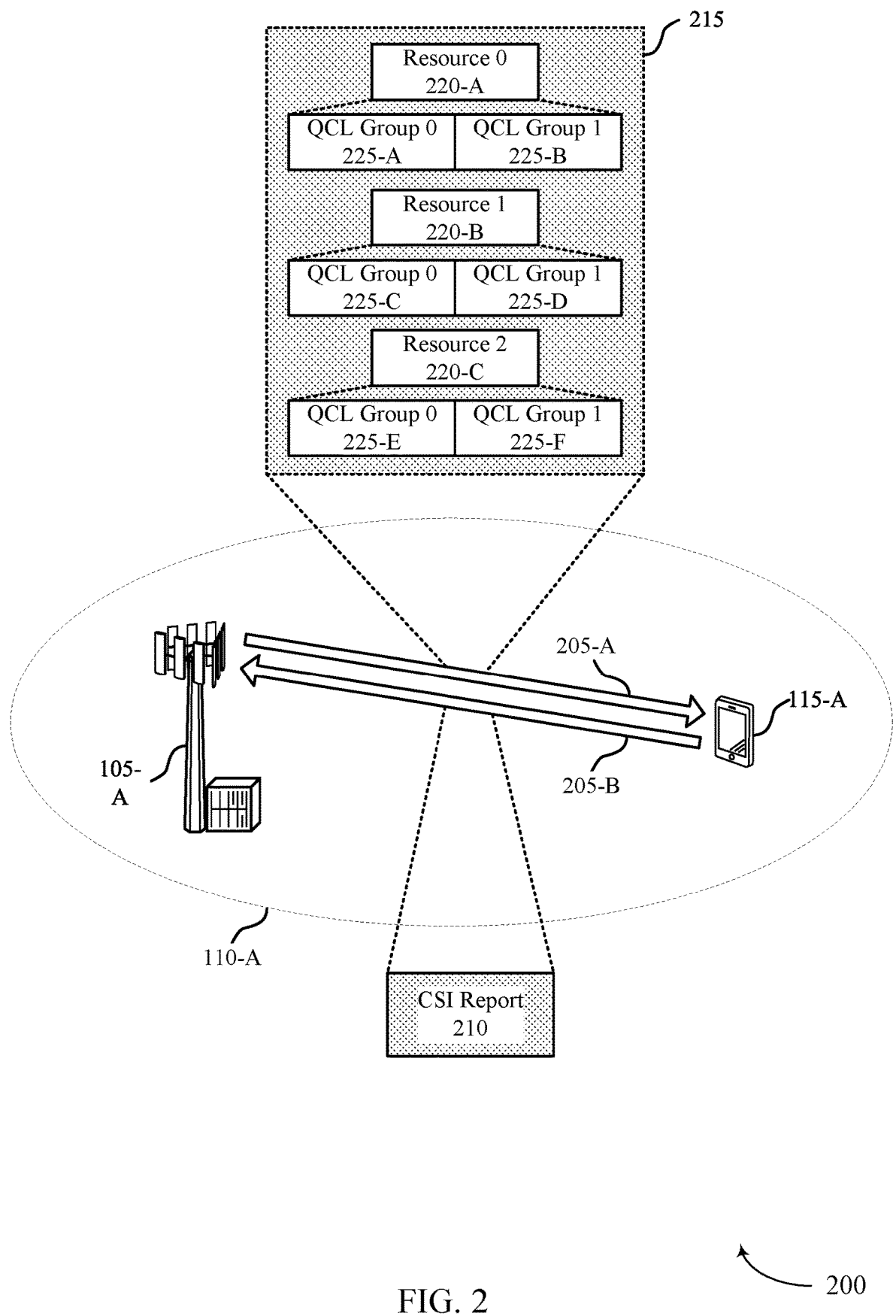

FIG. 2 illustrates an example of a wireless communications system 200 that supports URLLC with multiple TRPs in accordance with aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of carriers 205. In particular, base station 105-a may transmit downlink signals to UE 115-a on resources of a carrier 205-a, and UE 115-a may transmit uplink signals to base station 105-a on resources of a carrier 205-b. In some cases, carrier 205-a and carrier 205-b may be different, and, in other cases, carrier 205-a and carrier 205-b may be the same. Although FIG. 2 illustrates an example of a UE 115-a performing CSI reporting based on CSI-RSs received on CSI-RS resources from base station 105-a, it is to be understood that the CSI-RSs used to perform CSI reporting in accordance with the techniques described herein may be transmitted by multiple TRPs (e.g., TRPs connected to base station 105-a or TRPs connected to multiple base stations 105).

Wireless communications system 200 may implement aspects of wireless communications system 100. For example, wireless communications system 200 may support efficient techniques for performing CSI reporting based on a configured BLER target. In the example of FIG. 2, base station 105-a may transmit a CSI report configuration to UE 115, which may indicate a configuration for a CSI report 210 to be transmitted by UE 115-a to base station 105-a. For instance, the CSI report configuration may indicate one or more BLER targets associated with the CSI report 210 and may indicate a CSI-RS resource set 215 that includes CSI-RSs for the UE 115-a to use to perform measurements to generate the CSI report (e.g., where the CSI-RSs may be transmitted by multiple TRPSs). In some aspects, the CSI report configuration may indicate a mapping between each of the one or more BLER targets and corresponding CSI-RS resources, and UE 115-a may generate CSI feedback (e.g., to be included in CSI report 210) using CSI-RSs received on CSI-RS resources based on a BLER target mapped to the CSI-RS resources in the CSI report configuration.

In some cases, UE 115-a may be configured to transmit CSI reports based on the same BLER target (e.g., UE 115-a may be configured with CSI processes having the same BLER target) or based on different BLER targets (e.g., UE 115-a may be configured with CSI processes having different BLER targets). The configuration of whether to transmit CSI reports based on the same BLER target or different BLER targets may be fixed (e.g., not configurable) or variable (e.g., configurable via a MAC-CE, DCI message, or an RRC message from base station 105-a).

In such cases, UE 115-a may receive CSI-RSs on CSI-RS resources 220 of the CSI-RS resource set 215, and UE 115-a may perform measurements on the CSI-RSs to determine the CSI feedback (e.g., CQI) to include in CSI report 210. The CSI feedback included in CSI report 210 (e.g., CQI) may depend on the BLER target associated with CSI report 210. For instance, UE 115-a may receive an indication of different CQI tables associated with different BLER targets from base station 105 (e.g., in a MAC-CE, DCI, or an RRC message), and UE 115-a may determine a CQI to include in CSI report 210 from an appropriate CQI table based on a BLER target associated with CSI report 210. In addition, the CSI feedback included in CSI report 210 (e.g., CQI) may further be based on whether the antenna ports used to transmit the CSI-RSs received on CSI-RS resources 220 of the CSI-RS resource set 215 are in a same QCL group 225 or in different QCL groups 225 (e.g., in a coherent or non-coherent coordinated multipoint (CoMP) transmission).

In one example, if antenna ports in different QCL groups 225 are used to transmit CSI-RSs on CSI-RS resources 220 (as illustrated), and a single BLER target is configured for CSI report 210, UE 115-a may be configured to include CQI values in CSI report 210 for each QCL group 225 or for a subset of the QCL groups 225 based on the single BLER target. In one aspect of this example, UE 115-a may include, in CSI report 210, a CQI value for each QCL group 225 across all CSI-RS resources 220 of CSI-RS resource set 215 based on the single BLER target. In another aspect of this example, UE 115-a may include, in CSI report 210, a single CQI value for one QCL group 225 across all CSI-RS resources 220 of CSI-RS resource set 215.

In yet another aspect of this example, UE 115-a may be configured to include, in CSI report 210, a CQI value for each QCL group 225 on one CSI-RS resource 220 (e.g., CSI-RS resource 220-a) of the CSI-RS resource set 215 (e.g., each QCL group used to transmit CSI-RSs on the CSI-RS resource). The configuration of whether to include a CQI value for each QCL group 225 across all CSI-RS resources 220 of CSI-RS resource set 215, for one QCL group 225 across all CSI-RS resources 220 of CSI-RS resource set 215, or for each QCL group 225 on one CSI-RS resource 220 may be fixed (e.g., not configurable) or variable (e.g., configurable via a MAC-CE, DCI message, or an RRC message from base station 105-a). Further, the configuration may depend on a capability of UE 115-a.

In another example, if antenna ports in different QCL groups 225 are used to transmit CSI-RSs on CSI-RS resources 220 (as illustrated), and multiple BLER targets are configured for CSI report 210, UE 115-a may be configured to include CQI values in CSI report 210 for each QCL group 225. In this example, the number of BLER targets configured for CSI report 210 may be the same as the number of QCL groups 225 used to transmit CSI-RSs on CSI-RS resources 220 of CSI-RS resource set 215. Thus, each BLER target may be mapped to a QCL group (e.g., the BLER target values indicated in a CSI report configuration may be sequentially mapped to the QCL groups used to transmit the CSI-RSs), and UE 115-a may include, in CSI report 210, a CQI value for each QCL group 225 based on a corresponding BLER target. In yet another example, if antenna ports in the same QCL group are used to transmit CSI-RSs on CSI-RS resources 220 (not illustrated), a single BLER target may be configured for CSI report 210, and UE 115-a may be configured to include a single CQI value in CSI report 210 for all the CSI-RSs received.

Once base station 105-a receives the CSI report 210 from UE 115-a, base station 105-a may use the information in CSI report 210 to identify an appropriate configuration for communicating with UE 115-a. For example, base station 105-a may identify the CQI values included in the CSI report 210, and base station 105-a may use the CQI values to determine an appropriate modulation and coding scheme (MCS) for a transmission to UE 115-a. Specifically, the CQI values in CSI report 210 may correspond to a specific MCS in an MCS table, and base station 105-a may determine the MCS using the MCS table based on the CQI values. In some cases, the MCS tables may be different for different BLER targets, such that base station 105-a may be able to determine an appropriate MCS for a transmission based on the BLER target for that transmission.

In such cases, UE 115-a may receive an indication of different MCS tables associated with different BLER targets from base station 105 (e.g., in a MAC-CE, DCI, or an RRC message), and UE 115-a may determine an MCS to use for a transmission from an appropriate MCS table based on a BLER target associated with the transmission. Further, the MCS tables may be different for different QCL groups, such that a base station 105-a may be able to determine an appropriate MCS for a transmission based on an antenna port to be used for the transmission (i.e., base station 105-a may use the MCS table that corresponds to the QCL group of the antenna port to be used for a transmission). Alternatively, the MCS tables may be the same for different QCL groups.

Figure 3:
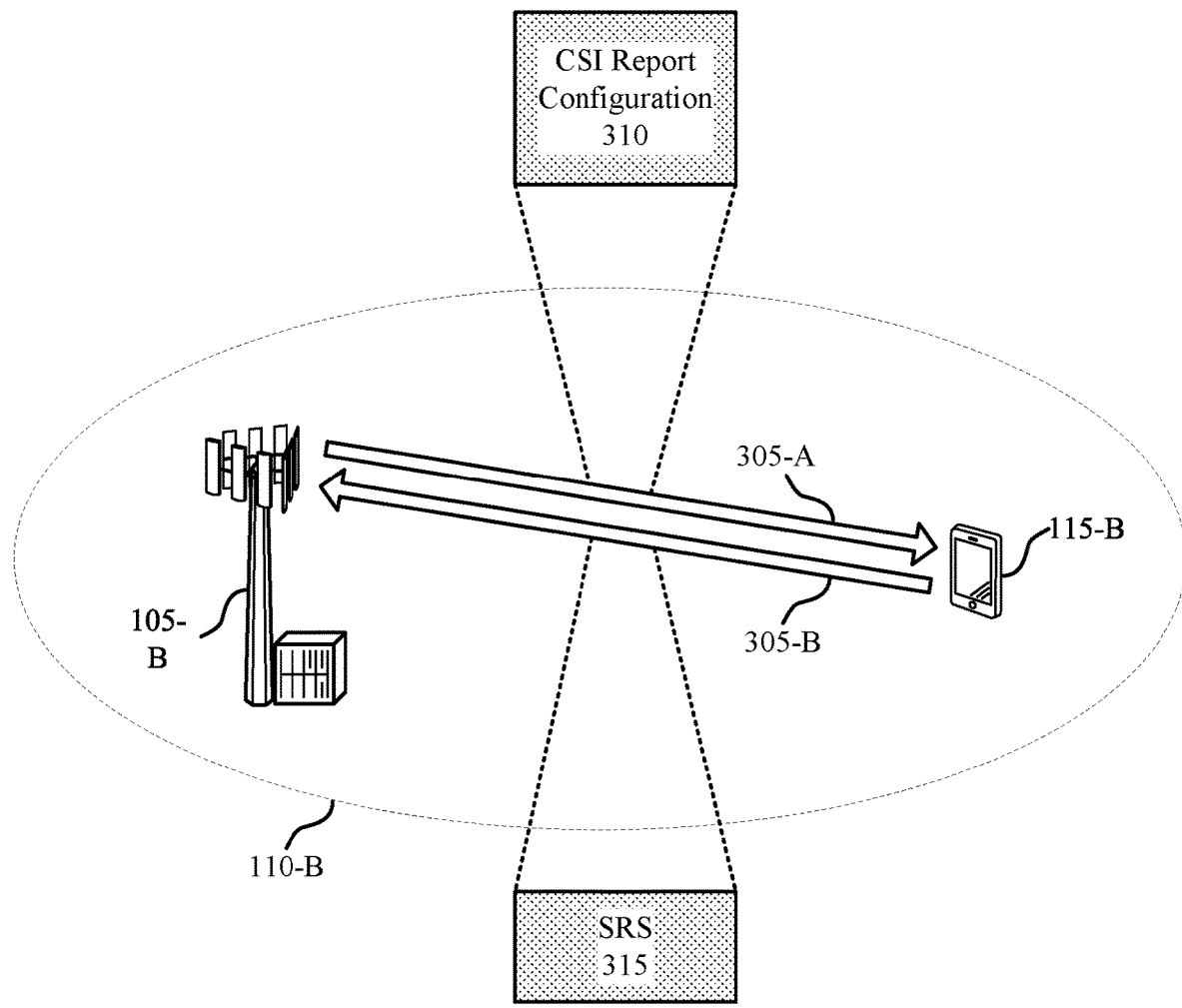

FIG. 3 illustrates an example of a wireless communications system 300 that supports URLLC with multiple TRPs in accordance with aspects of the present disclosure. Wireless communications system 300 includes base station 105-b and UE 115-b, which may be examples of the corresponding devices described with reference to FIGS. 1 and 2. Base station 105-b may communicate with UEs 115 (including UE 115-b) within coverage area 110-b. For example, base station 105-b may communicate with UE 115-b on resources of carriers 305. In particular, base station 105-b may transmit downlink signals to UE 115-b on resources of a carrier 305-a, and UE 115-b may transmit uplink signals to base station 105-b on resources of a carrier 305-b. In some cases, carrier 305-a and carrier 305-b may be different, and, in other cases, carrier 305-a and carrier 305-b may be the same.

Wireless communications system 300 may implement aspects of wireless communications system 100. For example, wireless communications system 300 may support efficient techniques for performing SRS transmissions based on a configured BLER target. In the example of FIG. 3, UE 115-b may be configured to transmit SRSs 315 to base station 105-b. Thus, as described herein, prior to transmitting the SRSs 315, UE 115-b may identify a BLER target associated with the SRS transmission 315 such that UE 115-b may be able to identify an appropriate configuration for the SRS transmission 315. In some cases, the BLER target for the SRS transmission 315 may be determined based on a BLER target configured for a CSI report.

In particular, base station 105-b may transmit a CSI report configuration 310 to UE 115-b, which may indicate a configuration for a CSI report to be transmitted by UE 115-b to base station 105-b, including a BLER target associated with the CSI report. Since an SRS resource configured for the SRS transmission 315 may be associated with a CSI-RS resource used to transmit CSI-RSs for a CSI report, UE 115-b may determine the BLER target for the SRS transmission based on the BLER target configured for the associated CSI report. That is, UE 115-b may determine the CSI-RS resource associated with an SRS resource for an SRS transmission, and UE 115-b may determine the BLER target for the SRS transmission to be the same as the BLER target configured for a CSI report generated using CSI-RSs received on the associated CSI-RS resource.

Once UE 115-b identifies the BLER target for the SRS transmission 315, UE 115-b may determine an appropriate configuration for the SRS transmission 315 using the techniques described herein. Specifically, UE 115-b may determine a bandwidth, a number of repetitions (e.g., in a time or frequency domain), a power, a number of SRS symbols, and a comb level for SRS transmission 315 based on the BLER target for the SRS transmission 315. That is, UE 115-b may determine an SRS density based on the BLER target for the SRS transmission 315. The values of the parameters described above (i.e., bandwidth, number of repetitions, power, number of SRS symbols, comb level, etc.) may be signaled to UE 115-b from base station 105-b for different BLER targets (e.g., in a MAC-CE, DCI, or an RRC message).

For a low BLER target (e.g., a BLER target below a threshold), UE 115-b may use a wider bandwidth, larger number of repetitions, higher power, larger number of SRS symbols (e.g., an SRS symbol for each QCL group available), lower comb level (e.g., comb-1 or comb-2), or a combination thereof for SRS transmission 315. For a high BLER target (e.g., a BLER target above a threshold), UE 115-b may use a narrower bandwidth, smaller number of repetitions, lower power, smaller number of SRS symbols, higher comb level (e.g., comb-4), or a combination thereof for SRS transmission 315. In some cases, UE 115-b may select a comb level for SRS transmission 315 based on a BLER target. In such cases, UE 115-b may be restricted to using low comb levels if SRS transmission 315 has a low BLER target, and UE 115-b may be able to use a wide range of comb levels if SRS transmission 315 has a high BLER target. In other cases, UE 115-b may be able to use a wide range of comb levels for SRS transmission 315, but UE 115-b may be configured to use high comb levels only when other techniques for improving the reliability of SRS transmission 315 are implemented (e.g., increased density).

Thus, the comb level used for SRS transmission 315 may be based on the bandwidth used for SRS transmission 315. Specifically, when a wide bandwidth is used for SRS transmission 315, UE 115-b may use a high comb level for SRS transmission 315 (e.g., without significantly degrading the quality of the SRS transmission 315), and when a narrow bandwidth is used for SRS transmission 315, UE 115-b may use a low comb level for SRS transmission 315. The use of a higher comb level may reduce the overhead of SRS transmission 315 such that more resources may be available for other channels (e.g., PUSCH), resulting in improved data transmission reliability since UE 115-b may be able to use a lower coding rate for a data transmission when more resources are available for a data transmission. Accordingly, in some aspects of the techniques described herein, UE 115-b may be configured to use a new comb level (e.g., comb-6) in conjunction with a wider bandwidth for SRS transmission 315.

Figure 4:
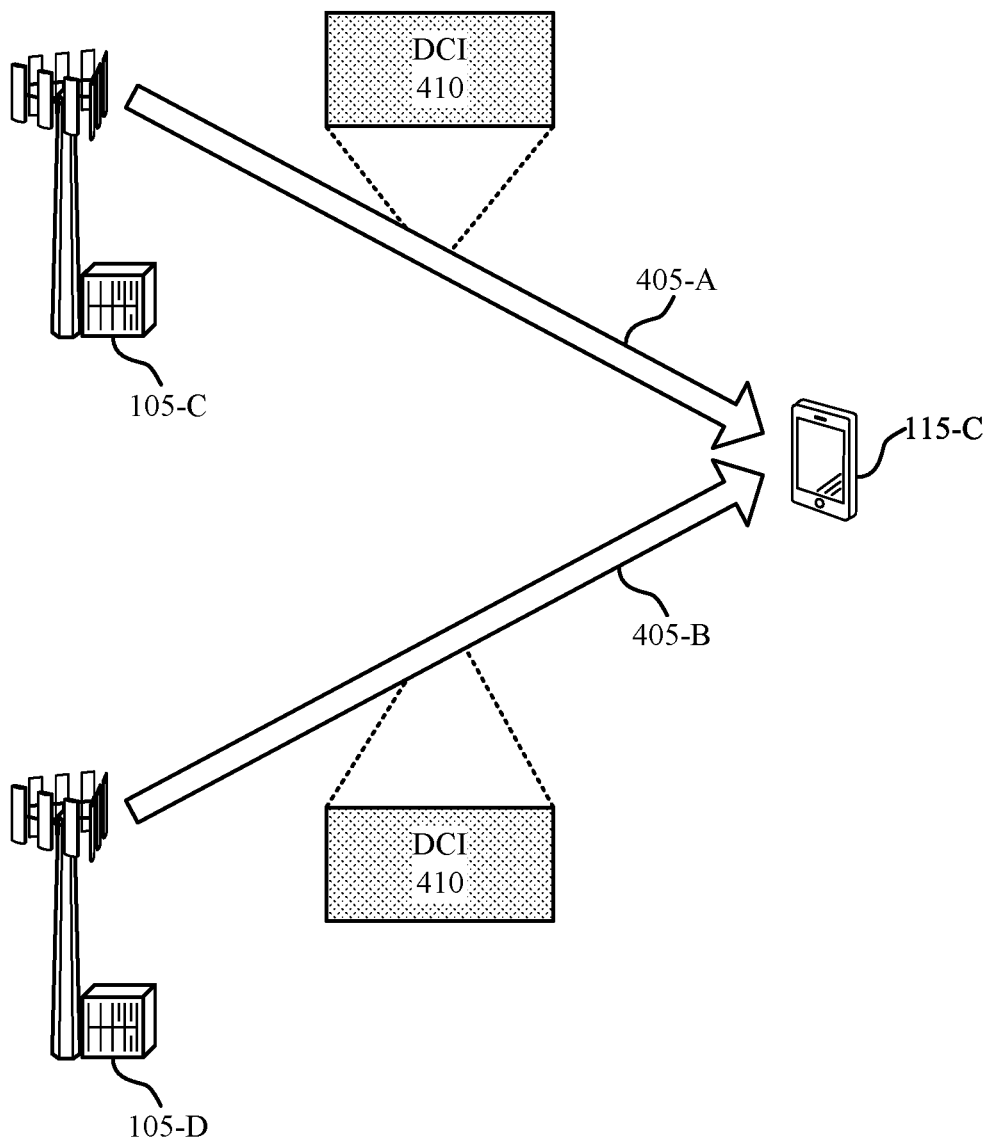

FIG. 4 illustrates an example of a wireless communications system 400 that supports URLLC with multiple TRPs in accordance with aspects of the present disclosure. Wireless communications system 400 includes base station 105-c, base station 105-d, and UE 115-c, which may be examples of the corresponding devices described with reference to FIGS. 1, 2, and 3. Base station 105-c may transmit downlink signals to UE 115-c on resources of a carrier 405-a, and base station 105-d may transmit downlink signals to UE 115-c on resources of a carrier 405-b. Wireless communications system 400 may implement aspects of wireless communications system 100. For example, wireless communications system 400 may support efficient techniques for performing PDCCH transmissions to improve the reliability of the PDCCH transmissions.

Specifically, in the example of FIG. 4, base station 105-c and base station 105-d (i.e., multiple base stations 105 or TRPs) may transmit the same DCI 410 to UE 115-c to improve the chances that DCI 410 is received by UE 115-c. Thus, using the techniques described herein, data transmissions and control transmissions may have multi-TRP diversity. The DCI 410 transmitted by base station 105-c and base station 105-d may include the same information. For instance, DCI 410 transmitted by base station 105-c and base station 105-d may include the same uplink grant for an uplink transmission to base station 105-c, base station 105-d, or both, or DCI 410 transmitted by base station 105-c and base station 105-d may include the same downlink grant for a downlink transmission from base station 105-c, base station 105-d, or both. Once UE 115-c receives DCI 410 from base station 105-c and base station 105-d, UE 115-c may combine the DCI.

In order for UE 115-c to receive the DCI 410 from base station 105-c and base station 105-d, the DCI 410 may be transmitted in corresponding PDCCH candidates (e.g., PDCCH decoding candidates). That is, there may be a one-to-one mapping between a PDCCH candidate that includes the DCI 410 from base station 105-c and a PDCCH candidate that includes the DCI 410 from base station 105-d. For example, if base station 105-c is able to transmit DCI 410 in two PDCCH candidates with an aggregation level of four (e.g., {4, 1} and {4, 2}) and one decoding candidate with an aggregation level of eight (e.g., {8, 1}), and base station 105-d is able to transmit DCI 410 in two PDCCH candidates with an aggregation level of four (e.g., {4, 1} and {4, 2}) and two PDCCH candidates with an aggregation level of eight (e.g., {8, 1} and {8, 2}), the DCI 410 may be included in the two PDCCH candidates with an aggregation level of four (e.g., ({4, 1}, {4, 1}) and ({4, 2}, {4,2})) and the first decoding candidate with an aggregation level of eight (e.g., ({8, 1}, {8, 1})). Thus, the DCI 410 may be included in PDCCH candidates from base station 105-c and base station 105-*d* having the same index (e.g., logical index) and the same aggregation level. In some cases, PDCCH candidates having the same index from different base stations may span different sets of resources (e.g., different resource elements).

Since the PDCCH from base station 105-*c* and base station 105-*d* may be used to transmit DCI 410 to UE 115-*c*, UE 115-*c* may rate-match around the PDCCH that may include DCI 410 from base station 105-*c* and base station 105-*d* (e.g., for receiving data from base station 105-*c* and/or base station 105-*d* and for transmitting data to base station 105-*c* and/or base station 105-*d*). In addition, if UE 115-*c* determines that the DCI 410 may also be transmitted by a third base station 105, UE 115-*c* may rate-match around the PDCCH that may include DCI 410 from the third base station 105 (e.g., regardless of whether the third base station 105 transmits the DCI 410). That is, UE 115-*c* may assume that DCI 410 is transmitted by all linked base stations 105 (or all linked TRPs), where linked base stations may correspond to base stations 105 configured to transmit the same DCI 410. In some cases, the PDCCH from base station 105-*c* and base station 105-*d* may include demodulation reference signals (DRMSs) on a same DMRS port or on different DMRS ports. The configuration of whether the PDCCH from different base stations 105 include DMRSs on the same DMRS port or on different DMRS ports may be configurable (e.g., via a MAC-CE, DCI message, or RRC message).

In the examples described above, a base station 105 may use a MAC-CE, DCI message, or RRC message to provide various configurations for CSI reporting, SRS transmissions, and PDCCH transmissions. In some cases, instead of these configurations being signaled using the MAC-CE, DCI message, or RRC message, these configurations may be stored at a UE 115 and may be activated or deactivated using the MAC-CE, DCI message, or RRC message. Alternatively, in other cases, these configurations may be activated or deactivated when a UE 115 enters or leaves a URLLC service mode, and the specific configurations may be identified based on the BLER target for a URLLC service. In such cases, the UE 115 may identify whether it has entered or left a URLLC mode based on a DCI format associated with the URLLC mode or based on an explicit bit in DCI that indicates whether the UE 115 is in the URLLC mode (e.g., a bit that indicates which mode the UE 115 is currently in).

Figure 5:
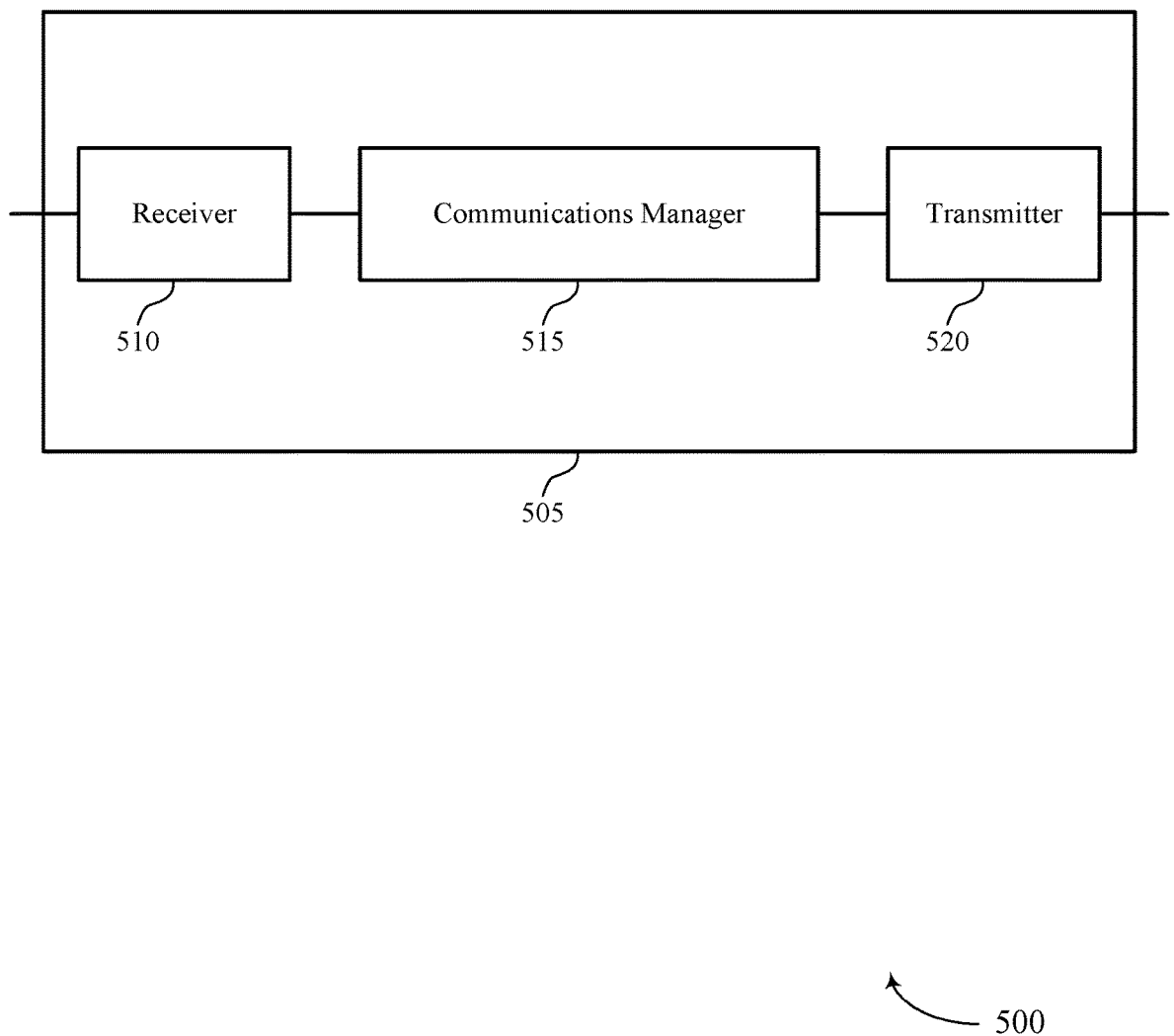
FIGS. 5 and 6 show block diagrams of devices that support URLLC with multiple TRPs in accordance with aspects of the present disclosure.

FIG. 5 shows a block diagram 500 of a device 505 that supports URLLC with multiple TRPs in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to URLLC with multiple TRPs, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a plurality of CSI-RSs on corresponding CSI-RS resources associated with a CSI report, the plurality of CSI-RSs being associated with one or more sets of quasi co-located antenna ports, identify, from a set of BLER targets, at least one BLER target, generate the CSI report based on the at least one BLER target and the plurality of CSI-RSs, and transmit the generated CSI report. The communications manager 515 may also identify, from a set of BLER targets, a BLER target for a transmission of a SRS, determine a configuration for transmitting the SRS based on the BLER target, and transmit the SRS according to the determined configuration. The communications manager 515 may also monitor a set of PDCCH candidates for DCI from a set of base stations, receive the DCI in the PDCCH candidates from the set of base stations, where each PDCCH candidate that includes the DCI from one base station maps to a PDCCH candidate that includes the DCI from another base station, combine the DCI received from the set of base stations in the set of PDCCH candidates, and receive data from or transmit data to at least one of the set of base stations based on the combined DCI. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
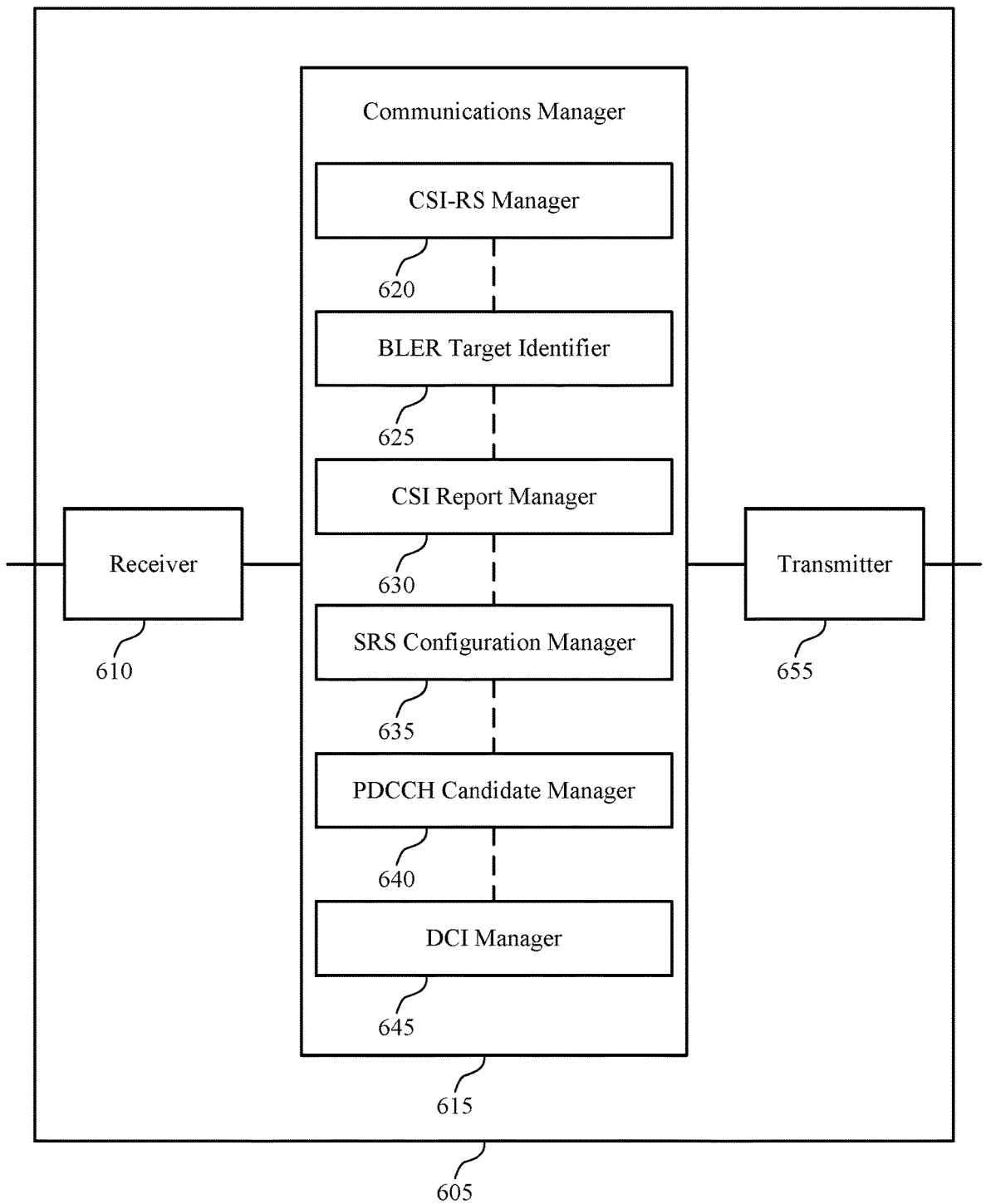

FIG. 6 shows a block diagram 600 of a device 605 that supports URLLC with multiple TRPs in accordance with aspects of the present disclosure. The device 605 may be an example of aspects of a device 505 or a UE 115 as described herein. The device 605 may include a receiver 610, a communications manager 615, and a transmitter 655. The device 605 may also include a processor. Each of these components may be in communication with one another (e.g., via one or more buses).

The receiver 610 may receive information such as packets, user data, or control information associated with various information channels (e.g., control channels, data channels, and information related to URLLC with multiple TRPs, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a CSI-RS manager 620, a BLER target identifier 625, a CSI report manager 630, an SRS configuration manager 635, a PDCCH candidate manager 640, and a DCI manager 645. The communications manager 615 may be an example of aspects of the communications manager 810 described herein.

The CSI-RS manager 620 may receive a plurality of CSI-RSs on corresponding CSI-RS resources associated with a CSI report, the plurality of CSI-RSs being associated with one or more sets of quasi co-located antenna ports. The BLER target identifier 625 may identify, from a set of BLER targets, at least one BLER target. The CSI report manager 630 may generate the CSI report based on the at least one BLER target and the plurality of CSI-RSs. The transmitter 655 may transmit the generated CSI report.

The BLER target identifier 625 may identify, from a set of BLER targets, a BLER target for a transmission of an SRS. The SRS configuration manager 635 may determine a configuration for transmitting the SRS based on the BLER target. The transmitter 655 may transmit the SRS according to the determined configuration.

The PDCCH candidate manager 640 may monitor a set of PDCCH candidates for DCI from a set of base stations. The DCI manager 645 may receive the DCI in the PDCCH candidates from the set of base stations, where each PDCCH candidate that includes the DCI from one base station maps to a PDCCH candidate that includes the DCI from another base station. The DCI manager 645 may then combine the DCI received from the set of base stations in the set of PDCCH candidates. The transmitter 655 may receive data from or transmitting data to at least one of the set of base stations based on the combined DCI.

The transmitter 655 may transmit signals generated by other components of the device 605. In some examples, the transmitter 655 may be collocated with a receiver 610 in a transceiver module. For example, the transmitter 655 may be an example of aspects of the transceiver 820 described with reference to FIG. 8. The transmitter 655 may utilize a single antenna or a set of antennas.

Figure 7:
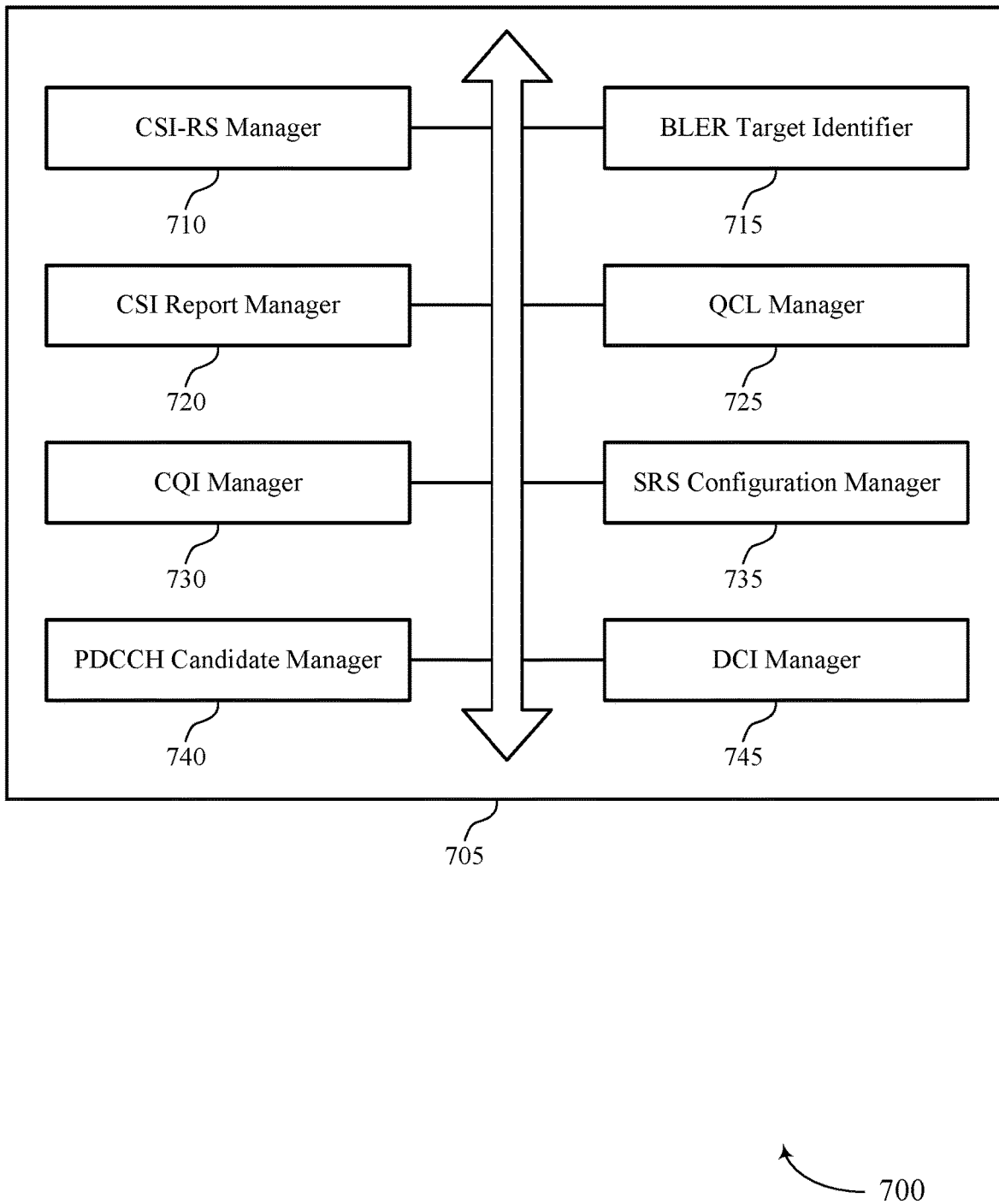
FIG. 7 shows a block diagram of a communications manager that supports URLLC with multiple TRPs in accordance with aspects of the present disclosure.

FIG. 7 shows a block diagram 700 of a communications manager 705 that supports URLLC with multiple TRPs in accordance with aspects of the present disclosure. The communications manager 705 may be an example of aspects of a communications manager 515, a communications manager 615, or a communications manager 810 described herein. The communications manager 705 may include a CSI-RS manager 710, a BLER target identifier 715, a CSI report manager 720, a QCL manager 725, a CQI manager 730, a SRS configuration manager 735, a PDCCH candidate manager 740, and a DCI manager 745. Each of these modules may communicate, directly or indirectly, with one another (e.g., via one or more buses).

The CSI-RS manager 710 may receive a plurality of CSI-RSs on corresponding CSI-RS resources associated with a CSI report, the plurality of CSI-RSs being associated with one or more sets of quasi co-located antenna ports. The BLER target identifier 715 may identify, from a set of BLER targets, at least one BLER target. The CSI report manager 720 may generate the CSI report based on the at least one BLER target and the plurality of CSI-RSs. A transmitter in communications with communications manager 705 may transmit the generated CSI report.

In some examples, the QCL manager 725 may determine that a single set of quasi co-located antenna ports was used to transmit the plurality of CSI-RSs on the corresponding CSI-RS resources, and the BLER target identifier 715 may identify that a same BLER target of the plurality of BLER targets is associated with the plurality of CSI-RSs received on the corresponding CSI-RS resources. In such examples, the CSI report manager 720 may generate the CSI report based on the same BLER target and the plurality of CSI-RSs.

In some examples, the QCL manager 725 may determine that a first set of quasi co-located antenna ports was used to transmit a first set of the plurality of CSI-RSs and a second set of quasi co-located antenna ports was used to transmit a second set of the plurality of CSI-RSs, and the BLER target identifier 715 may identify that a single BLER target of the plurality of BLER targets is associated with the plurality of CSI-RSs received on the corresponding CSI-RS resources. In such examples, the CSI report manager 720 may generate the CSI report based on the single BLER target and the first and second sets of the plurality of CSI-RSs.

In some cases, the CQI manager 730 may include a CQI in the CSI report for each of the first and second sets of the plurality of CSI-RSs based on the single BLER target. In other cases, the CQI manager 730 may include a CQI in the CSI report for either the first set of the plurality of CSI-RSs or the second set of the plurality of CSI-RSs based on the single BLER target. In yet other cases, the CQI manager 730 may include a CQI in the CSI report for each of the first and second sets of the plurality of CSI-RSs transmitted on a single CSI-RS resource of the corresponding CSI-RS resources based on the single BLER target.

In some examples, the QCL manager 725 may determine that a first set of quasi co-located antenna ports was used to transmit a first set of the plurality of CSI-RSs and a second set of quasi co-located antenna ports was used to transmit a second set of the plurality of CSI-RSs, and the BLER target identifier 715 may identify that multiple BLER targets of the set of BLER targets are associated with the plurality of CSI-RSs, each BLER target of the multiple BLER targets corresponding to a set of quasi co-located antenna ports used to transmit a set of the plurality of CSI-RSs. In such examples, the CSI report manager 720 may generate the CSI report based on the multiple BLER targets and the first and second sets of the plurality of CSI-RSs. In some cases, the CQI manager 730 may include a first CQI in the CSI report for the first set of the plurality of CSI-RSs based on a first BLER target of the multiple BLER targets, and the CQI manager 730 may include a second CQI in the CSI report for the second set of the plurality of CSI-RSs based on a second BLER target of the multiple BLER targets.

In some examples, the CSI report manager 720 may receive a CSI report configuration indicating the at least one BLER target. In some examples, the CQI manager 730 may receive a control message indicating a CQI table associated with each of the set of BLER targets. In some cases, the control message includes a MAC-CE, RRC message, or a DCI message. In some cases, the communications manager 705 is configured to transmit CSI reports, including the generated CSI report, associated with a same BLER target. In other cases, the communications manager 705 is configured to transmit CSI reports, including the generated CSI report, associated with different BLER targets.

The BLER target identifier 715 may identify, from a set of BLER targets, a BLER target for a transmission of an SRS. The SRS configuration manager 735 may determine a configuration for transmitting the SRS based on the BLER target. A transmitter in communications with communications manager 705 may transmit the SRS according to the determined configuration.

In some examples, the SRS configuration manager 735 may determine a bandwidth for the SRS transmission based on the BLER target. In some examples, the SRS configuration manager 735 may determine a number of repetitions in a time or frequency domain for the SRS transmission based on the BLER target. In some examples, the SRS configuration manager 735 may determine a power for the SRS transmission based on the BLER target. In some examples, the SRS configuration manager 735 may determine a number of symbols for the SRS transmission based on the BLER target. In some examples, the SRS configuration manager 735 may determine a comb level for the SRS transmission based on the BLER target. In some cases, the comb level is further based on a bandwidth to be used for the SRS transmission.

In some examples, the BLER target identifier 715 may receive a CSI report configuration associated with at least one CSI-RS resource, the CSI report configuration indicating a BLER target for a CSI report, and the BLER target identifier 715 may identify the BLER target for the transmission of the SRS as the BLER target for the CSI report based on an SRS resource for the transmission of the SRS being associated with the at least one CSI-RS resource. In some examples, the SRS configuration manager 735 may receive a control message indicating parameters for the SRS transmission. In some cases, the control message includes a MAC-CE, RRC message, or a DCI message.

The PDCCH candidate manager 740 may monitor a set of PDCCH candidates for DCI from a set of base stations. The DCI manager 745 may receive the DCI in the PDCCH candidates from the set of base stations, where each PDCCH candidate that includes the DCI from one base station maps to a PDCCH candidate that includes the DCI from another base station. The DCI manager 745 may then combine the DCI received from the set of base stations in the set of PDCCH candidates. A transmitter in communications with communications manager 705 may transmit data to at least one of the set of base stations based on the combined DCI, or a receiver in communications with communications manager 705 may receive data from at least one of the set of base stations based on the combined DCI.

In some cases, the data is rate-matched around the PDCCH candidates including DCI from the set of base stations and the PDCCH candidates without DCI from the set of base stations. In some cases, an index of each PDCCH candidate that includes the DCI is the same. In some cases, an aggregation level of each PDCCH candidate that includes the DCI is the same. In some cases, a first PDCCH candidate including the DCI from a first base station spans a same set of resource elements as a second PDCCH candidate including the DCI from a second base station. In some cases, a first PDCCH candidate including the DCI from a first base station spans a different set of resource elements from a second PDCCH candidate including the DCI from a second base station. In some cases, a first PDCCH including the DCI from a first base station includes DMRSs on a same port as DMRSs included in a second PDCCH including the DCI from a second base station. In some cases, a first PDCCH including the DCI from a first base station includes DMRSs on a different port from DMRSs included in a second PDCCH including the DCI from a second base station.

Figure 8:
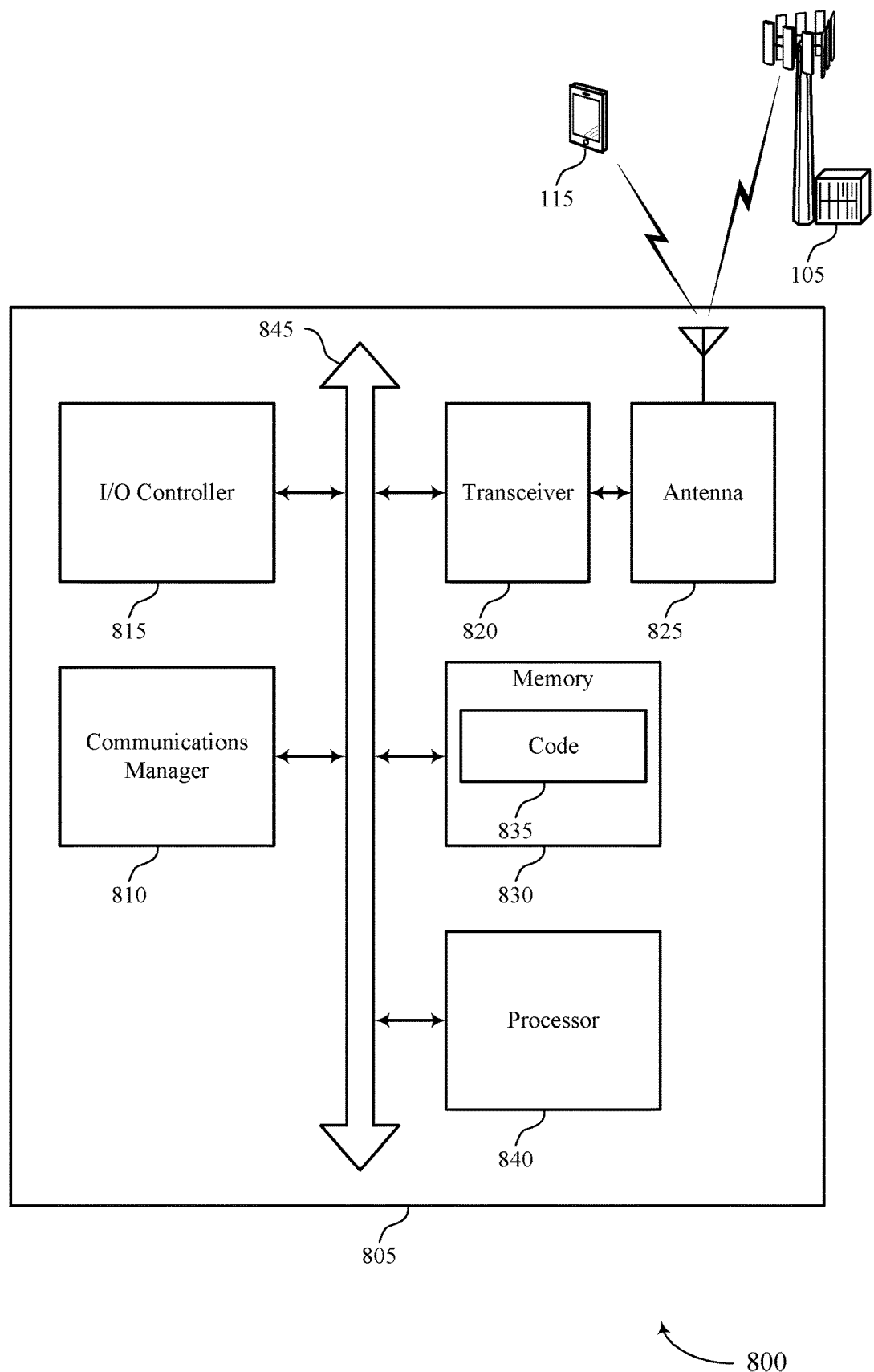
FIG. 8 shows a diagram of a system including a device that supports URLLC with multiple TRPs in accordance with aspects of the present disclosure.

FIG. 8 shows a diagram of a system 800 including a device 805 that supports URLLC with multiple TRPs in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a plurality of CSI-RSs on corresponding CSI-RS resources associated with a CSI report, the plurality of CSI-RSs being associated with one or more sets of quasi co-located antenna ports, identify, from a set of BLER targets, at least one BLER target, generate the CSI report based on the at least one BLER target and the plurality of CSI-RSs, and transmit the generated CSI report. The communications manager 810 may also identify, from a set of BLER targets, a BLER target for a transmission of an SRS, determine a configuration for transmitting the SRS based on the BLER target, and transmit the SRS according to the determined configuration. The communications manager 810 may also monitor a set of PDCCH candidates for DCI from a set of base stations, receive the DCI in the PDCCH candidates from the set of base stations, where each PDCCH candidate that includes the DCI from one base station maps to a PDCCH candidate that includes the DCI from another base station, combine the DCI received from the set of base stations in the set of PDCCH candidates, and receive data from or transmit data to at least one of the set of base stations based on the combined DCI.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting URLLC with multiple TRPs).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
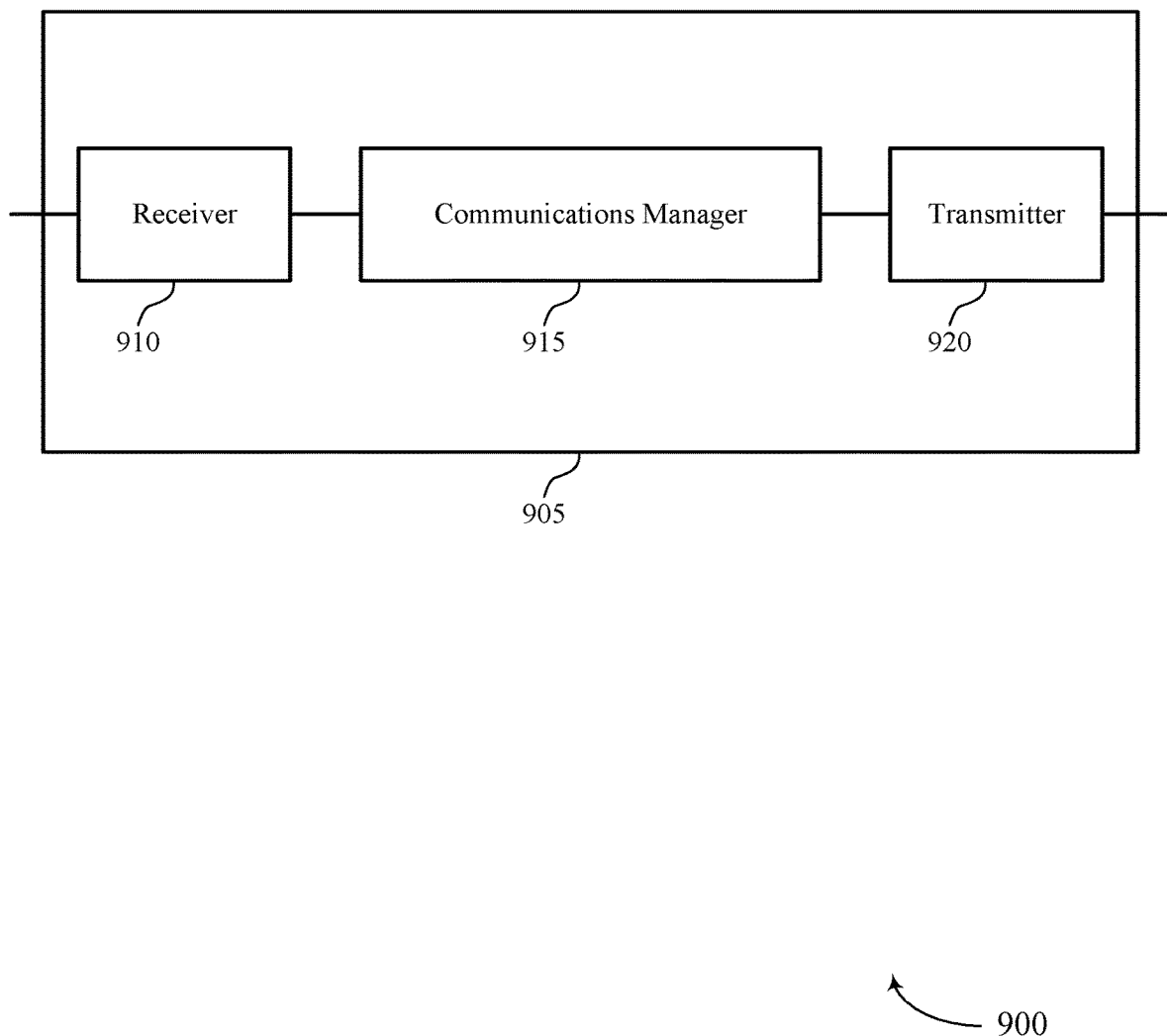
FIGS. 9 and 10 show block diagrams of devices that support URLLC with multiple TRPs in accordance with aspects of the present disclosure.

FIG. 9 shows a block diagram 900 of a device 905 that supports URLLC with multiple TRPs in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to URLLC with multiple TRPs, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a plurality of CSI-RSs to transmit on corresponding CSI-RS resources, transmit a control message indicating at least one BLER target, of a set of BLER targets, transmit the plurality of CSI-RSs on the corresponding CSI-RS resources on one or more sets of quasi co-located antenna ports, and receive a CSI report based on the at least one BLER target and the plurality of CSI-RSs. The communications manager 915 may also identify, from a set of BLER targets, a BLER target for a transmission of a SRS from a UE, transmit, to the UE, a control message indicating the BLER target for the transmission of the SRS from the UE, and receive the SRS in accordance with a configuration based on the BLER target. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
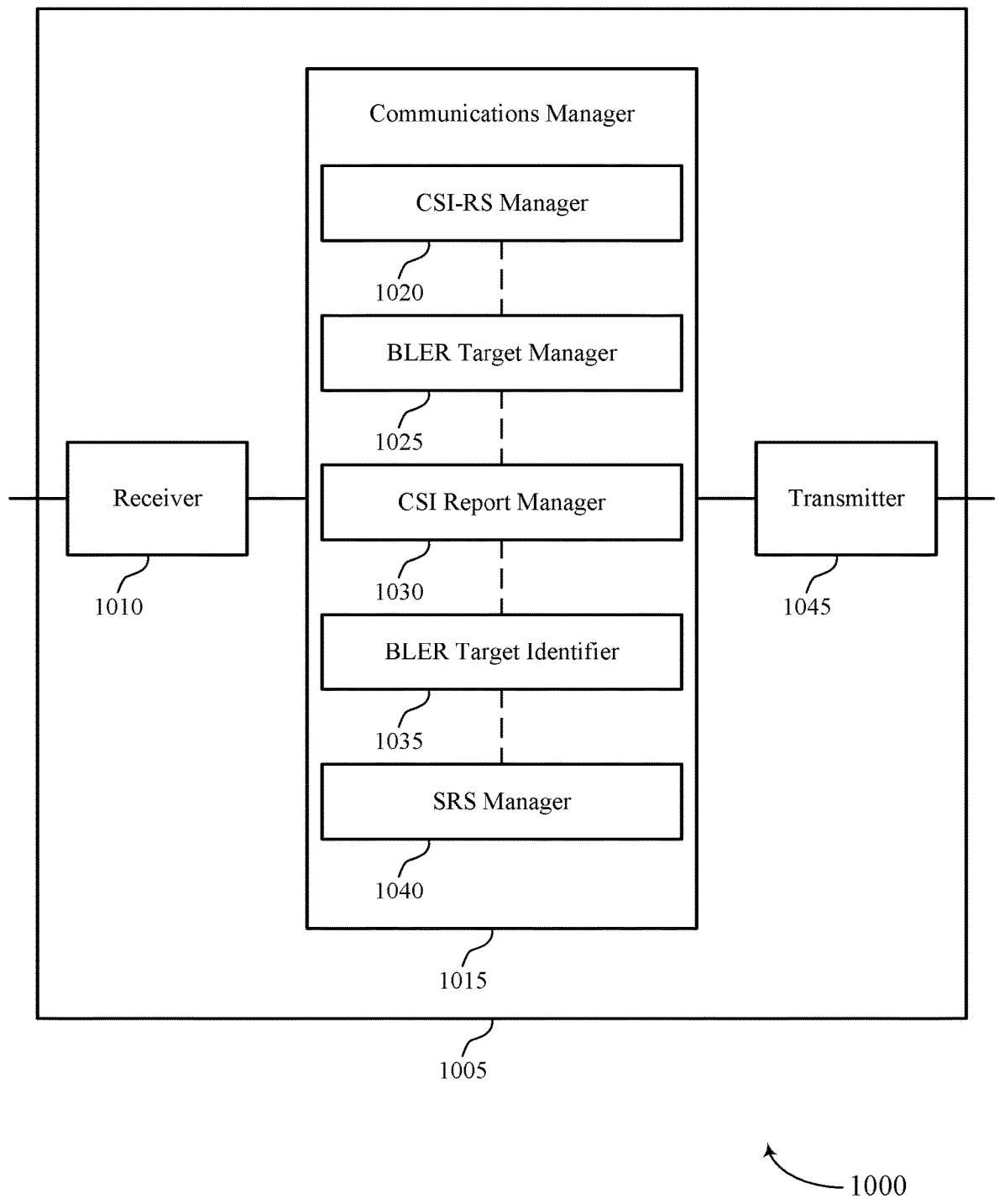

FIG. 10 shows a block diagram 1000 of a device 1005 that supports URLLC with multiple TRPs in accordance with aspects of the present disclosure. The device 1005 may be an example of aspects of a device 905 or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to URLLC with multiple TRPs, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CSI-RS manager 1020, a BLER target manager 1025, a CSI report manager 1030, a BLER target identifier 1035, and a SRS manager 1040. The communications manager 1015 may be an example of aspects of the communications manager 1210 described herein.

The CSI-RS manager 1020 may identify a plurality of CSI-RSs to transmit on corresponding CSI-RS resources. The BLER target manager 1025 may transmit a control message indicating at least one BLER target, of a set of BLER targets. The CSI-RS manager 1020 may transmit the plurality of CSI-RSs on the corresponding CSI-RS resources on one or more sets of quasi co-located antenna ports. The CSI report manager 1030 may receive a CSI report based on the at least one BLER target and the plurality of CSI-RSs.

The BLER target identifier 1035 may identify, from a set of BLER targets, a BLER target for a transmission of an SRS from a UE. The BLER target manager 1025 may transmit, to the UE, a control message indicating the BLER target for the transmission of the SRS from the UE. The SRS manager 1040 may receive the SRS in accordance with a configuration based on the BLER target.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
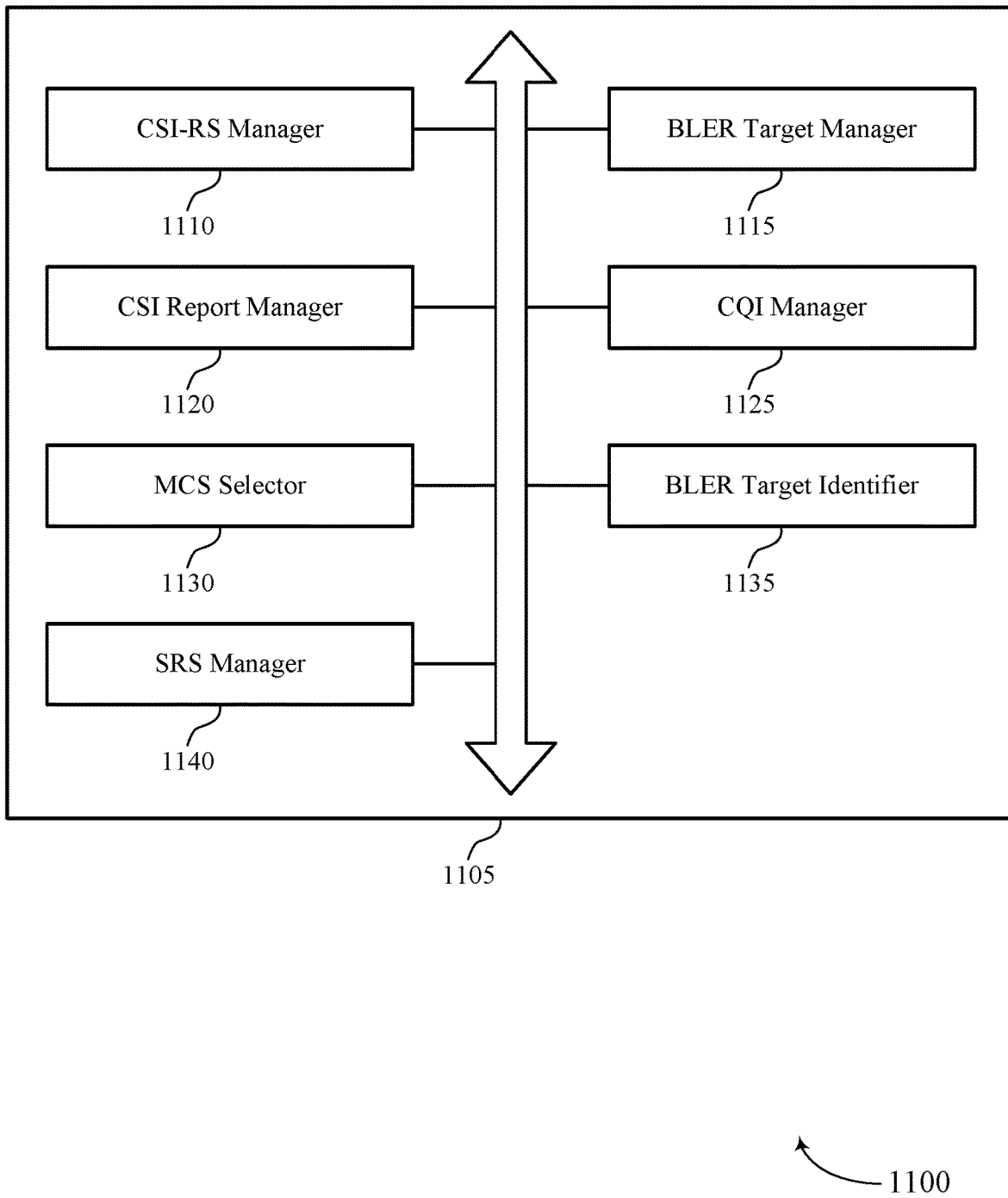
FIG. 11 shows a block diagram of a communications manager that supports URLLC with multiple TRPs in accordance with aspects of the present disclosure.

FIG. 11 shows a block diagram 1100 of a communications manager 1105 that supports URLLC with multiple TRPs in accordance with aspects of the present disclosure. The communications manager 1105 may be an example of aspects of a communications manager 915, a communications manager 1015, or a communications manager 1210 described herein. The communications manager 1105 may include a CSI-RS manager 1110, a BLER target manager 1115, a CSI report manager 1120, a CQI manager 1125, a MCS selector 1130, a BLER target identifier 1135, and an SRS manager 1140. Each of these modules may communicate, directly or indirectly, with one another (e.g., via one or more buses).

The CSI-RS manager 1110 may identify a plurality of CSI-RSs to transmit on corresponding CSI-RS resources. The BLER target manager 1115 may transmit a control message indicating at least one BLER target, of a set of BLER targets. The CSI-RS manager 1110 may transmit the plurality of CSI-RSs on the corresponding CSI-RS resources on one or more sets of quasi co-located antenna ports. The CSI report manager 1120 may receive a CSI report based on the at least one BLER target and the plurality of CSI-RSs.

The CQI manager 1125 may identify a CQI included in the CSI report associated with a BLER target of the at least one BLER target. The MCS selector 1130 may select an MCS for transmitting data associated with the BLER target based on the CQI. A transmitter in communication with communications manager 1105 may then transmit the data using the selected MCS. In some examples, the MCS selector 1130 may select the MCS for transmitting the data associated with the BLER target from an MCS table associated with the BLER target. In some cases, the MCS table associated with the BLER target is used to select MCSs for data transmissions using any set of antenna ports. In some cases, the MCS table associated with the BLER target includes a first MCS table used to select MCSs for data transmissions using a first set of quasi co-located antenna ports, the first MCS table being different from a second MCS table used to select MCSs for data transmissions using a second set of quasi co-located antenna ports.

In some cases, the indication of the at least one BLER target is included in a CSI report configuration. In some examples, the CQI manager 1125 may transmit another control message indicating a CQI table associated with each of the set of BLER targets. In some cases, the other control message includes a MAC-CE, RRC message, or a DCI message.

The BLER target identifier 1135 may identify, from a set of block error rate (BLER) targets, a BLER target for a transmission of a SRS from a UE. The BLER target manager 1115 may transmit, to the UE, a control message indicating the BLER target for the transmission of the SRS from the UE. The SRS manager 1140 may receive the SRS in accordance with a configuration based on the BLER target.

In some cases, the configuration includes a bandwidth used for the SRS transmission. In some cases, the configuration includes a number of repetitions in a time or frequency domain used for the SRS transmission. In some cases, the configuration includes a power used for the SRS transmission. In some cases, the configuration includes a number of symbols used for the SRS transmission. In some cases, the configuration includes a comb level used for the SRS transmission. In some cases, the comb level is based on a bandwidth used for the SRS transmission.

In some cases, the indication of the BLER target is included in a CSI report configuration. In some examples, the SRS manager 1140 may transmit another control message indicating SRS parameters for the SRS transmission. In some cases, the other control message includes a MAC-CE, RRC message, or a DCI message.

Figure 12:
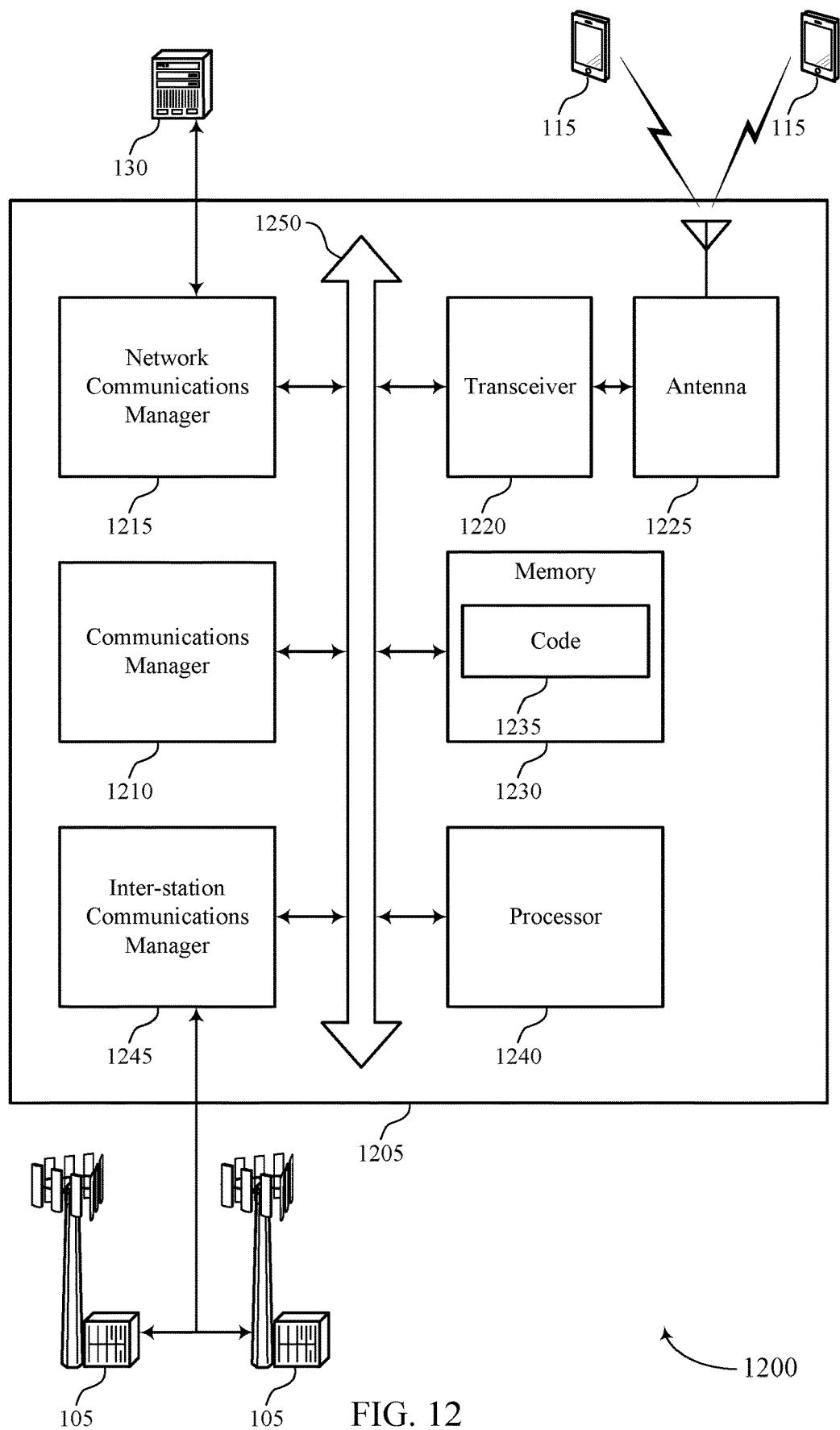
FIG. 12 shows a diagram of a system including a device that supports URLLC with multiple TRPs in accordance with aspects of the present disclosure.

FIG. 12 shows a diagram of a system 1200 including a device 1205 that supports URLLC with multiple TRPs in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a plurality of CSI-RSs to transmit on corresponding CSI-RS resources, transmit a control message indicating at least one BLER target, of a set of BLER targets, transmit the plurality of CSI-RSs on the corresponding CSI-RS resources on one or more sets of quasi co-located antenna ports, and receive a CSI report based on the at least one BLER target and the plurality of CSI-RSs. The communications manager 1210 may also identify, from a set of BLER targets, a BLER target for a transmission of a SRS from a UE, transmit, to the UE, a control message indicating the BLER target for the transmission of the SRS from the UE, and receive the SRS in accordance with a configuration based on the BLER target.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting URLLC with multiple TRPs).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
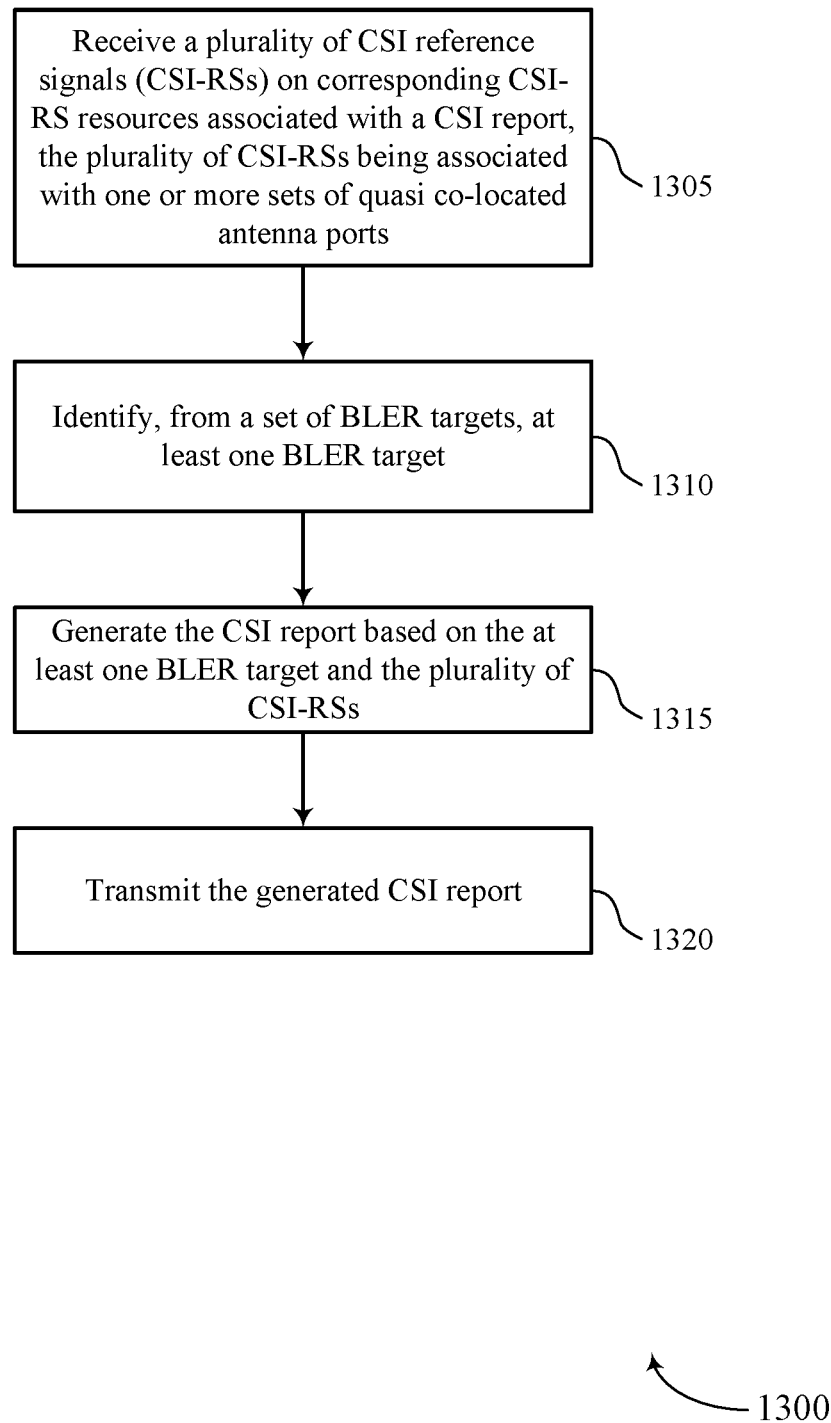
FIGS. 13-17 show flowcharts illustrating methods that support URLLC with multiple TRPs in accordance with aspects of the present disclosure.

FIG. 13 shows a flowchart illustrating a method 1300 that supports URLLC with multiple TRPs in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive a plurality of CSI-RSs on corresponding CSI-RS resources associated with a CSI report, the plurality of CSI-RSs being associated with one or more sets of quasi co-located antenna ports. The operations of 1305 may be performed according to the methods described herein. In some examples, aspects of the operations of 1305 may be performed by a CSI-RS manager as described with reference to FIGS. 5 through 8.

At 1310, the UE may identify, from a set of BLER targets, at least one BLER target. The operations of 1310 may be performed according to the methods described herein. In some examples, aspects of the operations of 1310 may be performed by a BLER target identifier as described with reference to FIGS. 5 through 8.

At 1315, the UE may generate the CSI report based on the at least one BLER target and the plurality of CSI-RSs. The operations of 1315 may be performed according to the methods described herein. In some examples, aspects of the operations of 1315 may be performed by a CSI report manager as described with reference to FIGS. 5 through 8.

At 1320, the UE may transmit the generated CSI report. The operations of 1320 may be performed according to the methods described herein. In some examples, aspects of the operations of 1320 may be performed by a transmitter as described with reference to FIGS. 5 through 8.

Figure 14:
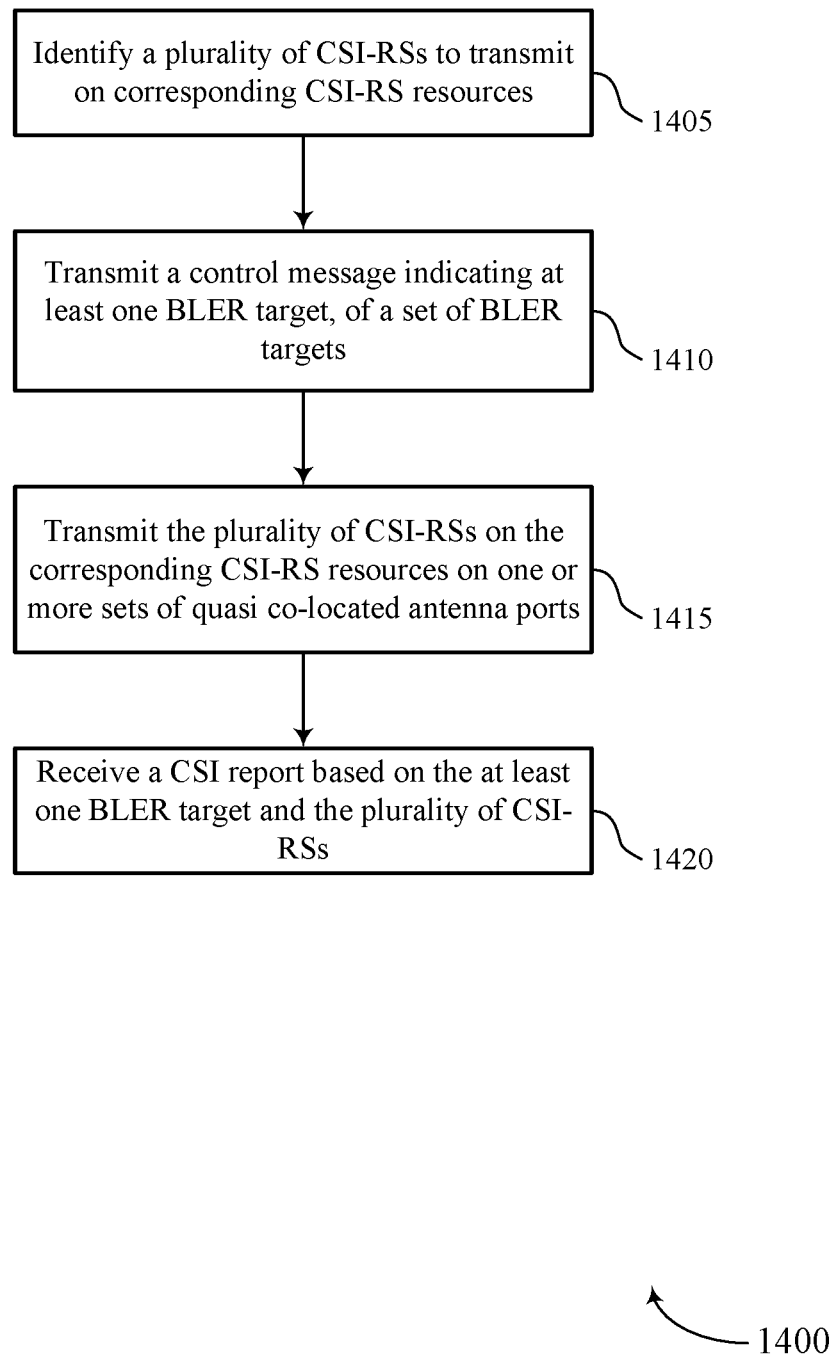

FIG. 14 shows a flowchart illustrating a method 1400 that supports URLLC with multiple TRPs in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may identify a plurality of CSI-RSs to transmit on corresponding CSI-RS resources. The operations of 1405 may be performed according to the methods described herein. In some examples, aspects of the operations of 1405 may be performed by a CSI-RS manager as described with reference to FIGS. 9 through 12.

At 1410, the base station may transmit a control message indicating at least one BLER target, of a set of BLER targets. The operations of 1410 may be performed according to the methods described herein. In some examples, aspects of the operations of 1410 may be performed by a BLER target manager as described with reference to FIGS. 9 through 12.

At 1415, the base station may transmit the plurality of CSI-RSs on the corresponding CSI-RS resources on one or more sets of quasi co-located antenna ports. The operations of 1415 may be performed according to the methods described herein. In some examples, aspects of the operations of 1415 may be performed by a CSI-RS manager as described with reference to FIGS. 9 through 12.

At 1420, the base station may receive a CSI report based on the at least one BLER target and the plurality of CSI-RSs. The operations of 1420 may be performed according to the methods described herein. In some examples, aspects of the operations of 1420 may be performed by a CSI report manager as described with reference to FIGS. 9 through 12.

Figure 15:
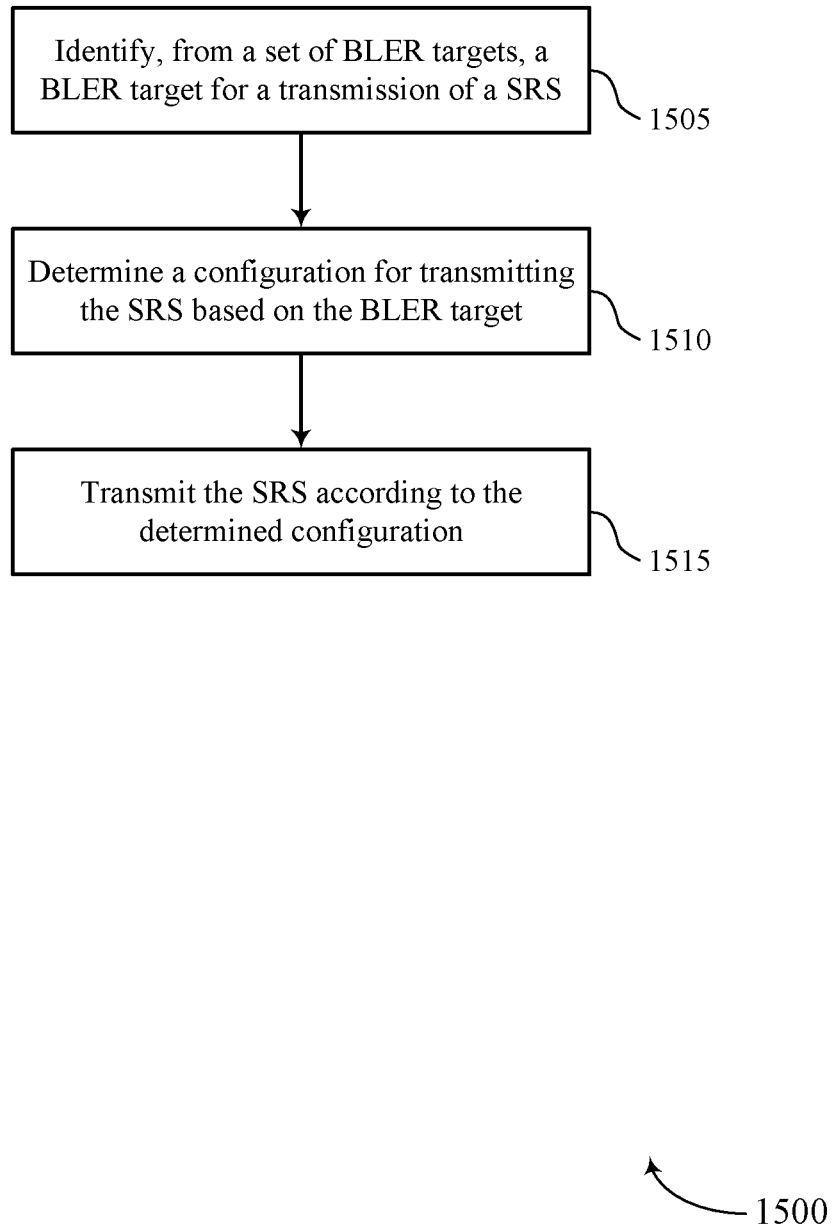

FIG. 15 shows a flowchart illustrating a method 1500 that supports URLLC with multiple TRPs in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1505, the UE may identify, from a set of BLER targets, a BLER target for a transmission of a SRS. The operations of 1505 may be performed according to the methods described herein. In some examples, aspects of the operations of 1505 may be performed by a BLER target identifier as described with reference to FIGS. 5 through 8.

At 1510, the UE may determine a configuration for transmitting the SRS based on the BLER target. The operations of 1510 may be performed according to the methods described herein. In some examples, aspects of the operations of 1510 may be performed by a SRS configuration manager as described with reference to FIGS. 5 through 8.

At 1515, the UE may transmit the SRS according to the determined configuration. The operations of 1515 may be performed according to the methods described herein. In some examples, aspects of the operations of 1515 may be performed by a transmitter as described with reference to FIGS. 5 through 8.

Figure 16:
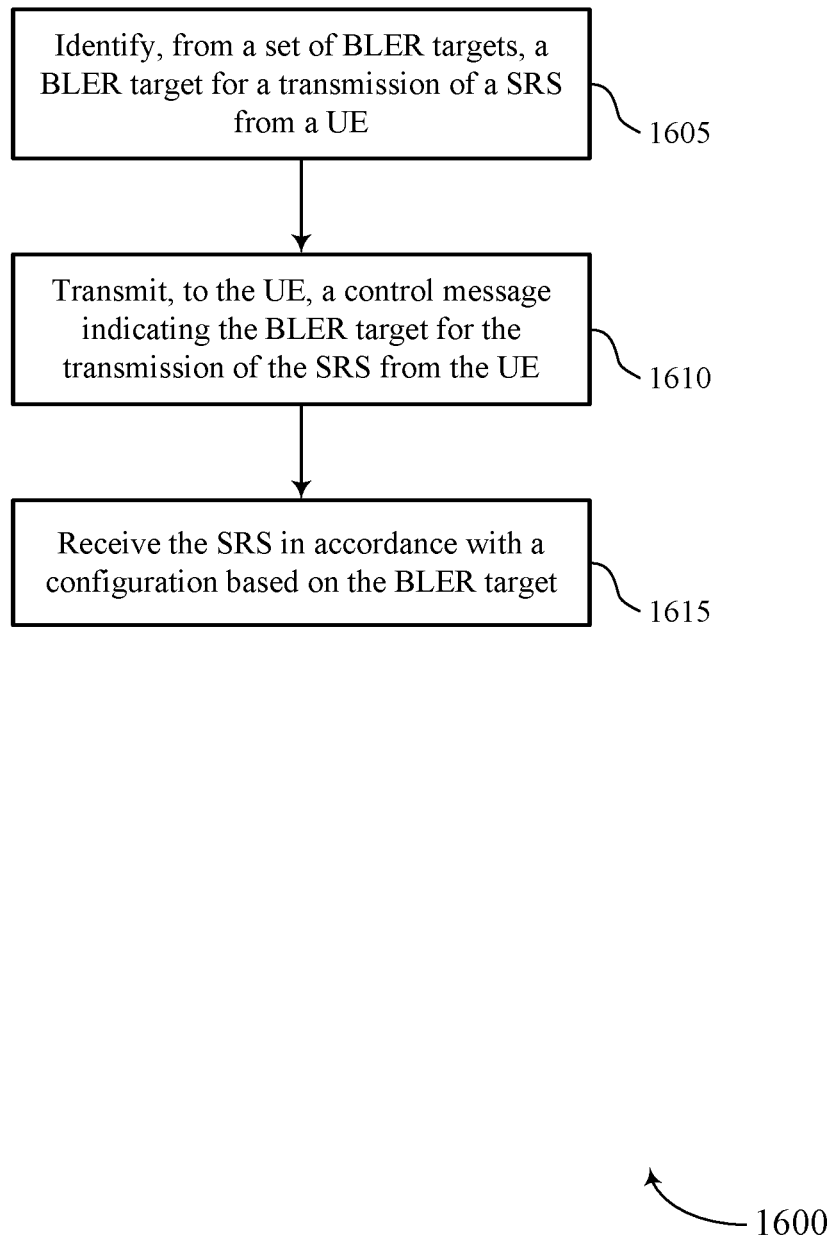

FIG. 16 shows a flowchart illustrating a method 1600 that supports URLLC with multiple TRPs in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1605, the base station may identify, from a set of BLER targets, a BLER target for a transmission of a SRS from a UE. The operations of 1605 may be performed according to the methods described herein. In some examples, aspects of the operations of 1605 may be performed by a BLER target identifier as described with reference to FIGS. 9 through 12.

At 1610, the base station may transmit, to the UE, a control message indicating the BLER target for the transmission of the SRS from the UE. The operations of 1610 may be performed according to the methods described herein. In some examples, aspects of the operations of 1610 may be performed by a BLER target manager as described with reference to FIGS. 9 through 12.

At 1615, the base station may receive the SRS in accordance with a configuration based on the BLER target. The operations of 1615 may be performed according to the methods described herein. In some examples, aspects of the operations of 1615 may be performed by a SRS manager as described with reference to FIGS. 9 through 12.

Figure 17:
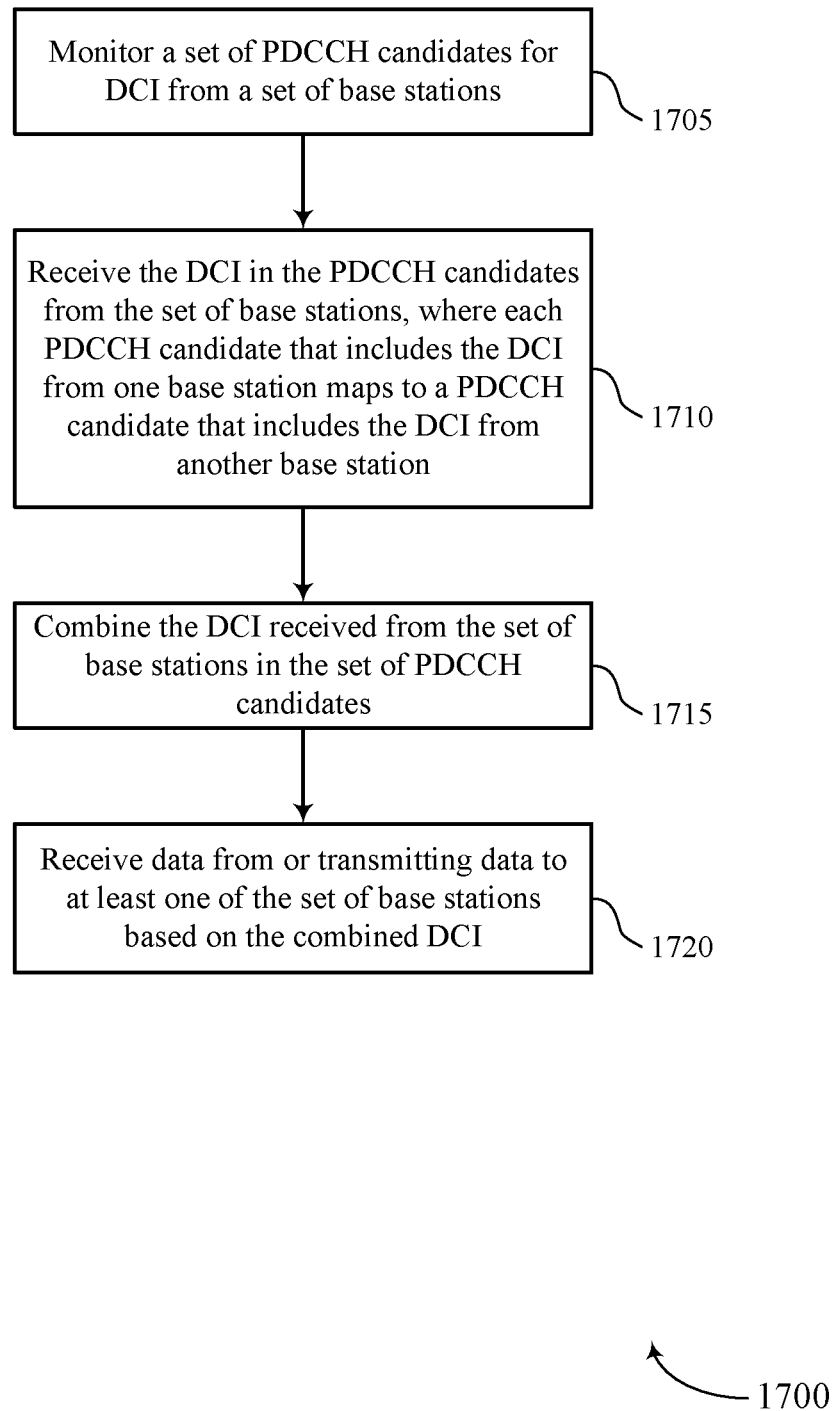

FIG. 17 shows a flowchart illustrating a method 1700 that supports URLLC with multiple TRPs in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1705, the UE may monitor a set of PDCCH candidates for DCI from a set of base stations. The operations of 1705 may be performed according to the methods described herein. In some examples, aspects of the operations of 1705 may be performed by a PDCCH candidate manager as described with reference to FIGS. 5 through 8.

At 1710, the UE may receive the DCI in the PDCCH candidates from the set of base stations, where each PDCCH candidate that includes the DCI from one base station maps to a PDCCH candidate that includes the DCI from another base station. The operations of 1710 may be performed according to the methods described herein. In some examples, aspects of the operations of 1710 may be performed by a DCI manager as described with reference to FIGS. 5 through 8.

At 1715, the UE may combine the DCI received from the set of base stations in the set of PDCCH candidates. The operations of 1715 may be performed according to the methods described herein. In some examples, aspects of the operations of 1715 may be performed by a DCI manager as described with reference to FIGS. 5 through 8.

At 1720, the UE may receive data from or transmitting data to at least one of the set of base stations based on the combined DCI. The operations of 1720 may be performed according to the methods described herein. In some examples, aspects of the operations of 1720 may be performed by a transmitter as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
  one or more processors configured to cause the UE to:
   monitor for downlink control information (DCI) in:
    a first physical downlink control channel (PDCCH) candidate, and a second PDCCH candidate different than the first PDCCH candidate, the first PDCCH candidate corresponding to a same PDCCH candidate index as the second PDCCH candidate; and obtain first DCI in the first PDCCH candidate and second DCI in the second PDCCH candidate according to the monitoring, wherein the first DCI and the second DCI comprise same information in accordance with the first PDCCH candidate corresponding to the same PDCCH candidate index as the second PDCCH candidate.

2. The UE of claim 1, wherein the first DCI and the second DCI comprise the same information further in accordance with the first PDCCH candidate corresponding to a same aggregation level as the second PDCCH candidate.

3. The UE of claim 1, wherein the one or more processors are further configured to cause the UE to:
combine the first DCI and the second DCI to obtain combined DCI in accordance with the first DCI and the second DCI comprising the same information.

4. The UE of claim 3, wherein the one or more processors are further configured to cause the UE to:
obtain or output data in accordance with the combined DCI.

5. The UE of claim 1, wherein the first DCI and the second DCI comprise the same information further in accordance with the first DCI and the second DCI corresponding to linked transmission-reception points (TRPs).

6. The UE of claim 5, wherein the one or more processors configured to cause the UE to obtain the first DCI and the second DCI are configured to cause the UE to:
obtain the first DCI corresponding to a first TRP of the linked TRPs; and
obtain the second DCI corresponding to a second TRP of the linked TRPs, wherein the first TRP is linked to the second TRP.

7. The UE of claim 1, wherein the one or more processors are further configured to cause the UE to:
obtain data rate-matched around the first PDCCH candidate and the second PDCCH candidate.

8. The UE of claim 1, wherein the one or more processors are further configured to cause the UE to:
rate-match data around the first PDCCH candidate and the second PDCCH candidate; and
output the data in accordance with the rate-matching.

9. The UE of claim 1, wherein the first DCI and the second DCI are received via a plurality of search spaces.

10. The UE of claim 9, wherein the plurality of search spaces comprises a common search space and one or more UE-specific search spaces.

11. A method for wireless communication at a user equipment (UE), comprising:
monitoring for downlink control information (DCI) in:
a first physical downlink control channel (PDCCH) candidate, and
a second PDCCH candidate different than the first PDCCH candidate, the first PDCCH candidate corresponding to a same PDCCH candidate index as the second PDCCH candidate; and
receiving first DCI in the first PDCCH candidate and second DCI in the second PDCCH candidate according to the monitoring, wherein the first DCI and the second DCI comprise same information in accordance with the first PDCCH candidate corresponding to the same PDCCH candidate index as the second PDCCH candidate.

12. The method of claim 11, wherein the first DCI and the second DCI comprise the same information further in accordance with the first PDCCH candidate corresponding to a same aggregation level as the second PDCCH candidate.

13. The method of claim 11, further comprising:
combining the first DCI and the second DCI to obtain combined DCI in accordance with the first DCI and the second DCI comprising the same information.

14. The method of claim 13, further comprising:
communicating data in accordance with the combined DCI.

15. The method of claim 11, wherein the first DCI and the second DCI comprise the same information further in accordance with the first DCI and the second DCI corresponding to linked transmission-reception points (TRPs).

16. The method of claim 15, wherein receiving the first DCI and the second DCI comprises:
receiving the first DCI corresponding to a first TRP of the linked TRPs; and
receiving the second DCI corresponding to a second TRP of the linked TRPs, wherein the first TRP is linked to the second TRP.

17. The method of claim 11, further comprising:
receiving data rate-matched around the first PDCCH candidate and the second PDCCH candidate.

18. The method of claim 11, further comprising:
rate-matching data around the first PDCCH candidate and the second PDCCH candidate; and
transmitting the data in accordance with the rate-matching.

19. The method of claim 11, wherein the first DCI and the second DCI are received via a plurality of search spaces.

20. The method of claim 19, wherein the plurality of search spaces comprises a common search space and one or more UE-specific search spaces.

* * * * *